(12) United States Patent
Shao

(10) Patent No.: US 12,299,102 B2
(45) Date of Patent: *May 13, 2025

(54) PERSONAL AUTHENTICATION SYSTEM, PERSONAL AUTHENTICATION DEVICE, DISPLAY DEVICE, AND PERSONAL AUTHENTICATION METHOD

(71) Applicant: Japan Display Inc., Tokyo (JP)

(72) Inventor: Gang Shao, Tokyo (JP)

(73) Assignee: Japan Display Inc., Tokyo (JP)

(*) Notice: Subject to any disclaimer, the term of this patent is extended or adjusted under 35 U.S.C. 154(b) by 217 days.

This patent is subject to a terminal disclaimer.

(21) Appl. No.: 18/212,602

(22) Filed: Jun. 21, 2023

(65) Prior Publication Data

US 2023/0334134 A1 Oct. 19, 2023

Related U.S. Application Data

(63) Continuation of application No. PCT/JP2021/048693, filed on Dec. 27, 2021.

(30) Foreign Application Priority Data

Dec. 28, 2020 (JP) ................. 2020-218840

(51) Int. Cl.
| | | |
|---|---|---|
| *G06F 21/00* | (2013.01) | |
| *G06F 21/32* | (2013.01) | |
| *G06V 40/12* | (2022.01) | |

(52) U.S. Cl.
CPC .......... *G06F 21/32* (2013.01); *G06V 40/1335* (2022.01)

(58) Field of Classification Search
CPC ..... G06F 21/32; G06F 21/31; G06V 40/1335; G06V 40/1306
See application file for complete search history.

(56) References Cited

U.S. PATENT DOCUMENTS

| 11,620,367 B2 * | 4/2023 | Liu ................. G06V 40/10 |
| | | 713/186 |
| 2010/0009658 A1 * | 1/2010 | Wu ................. H04W 12/06 |
| | | 455/411 |

(Continued)

FOREIGN PATENT DOCUMENTS

| JP | 2001167274 A | 6/2001 |
| JP | 2006085559 A | 3/2006 |

(Continued)

OTHER PUBLICATIONS

International Search Report from corresponding PCT application PCT/JP2021/048693, dated Mar. 22, 2022.

*Primary Examiner* — William A Corum, Jr.
(74) *Attorney, Agent, or Firm* — K&L Gates LLP

(57) ABSTRACT

A personal authentication system includes: a detection device having a first period in which detection of a detection target body is performed and a second period in which detection of asperities on a surface of the detection target body is performed; and a control device. The detection device has, as input keys for a password, first regions in a detection region. The detection device is configured to allocate mutually different segmented regions in a second region having center coordinates at touch detection coordinates detected in the first region in the first period for each key inputting of the password, and output a segmented image acquired in the segmented region in the second period to the control device for each key inputting of the password. The control device is configured to generate a fingerprint image by synthesizing the segmented images acquired in the respective key inputtings of the password.

20 Claims, 29 Drawing Sheets

(56) References Cited

U.S. PATENT DOCUMENTS

| | | | |
|---|---|---|---|
| 2014/0359757 A1 | 12/2014 | Sezan et al. | |
| 2017/0177847 A1* | 6/2017 | Shi | G06F 21/32 |
| 2019/0266315 A1* | 8/2019 | Li | G06V 40/1365 |
| 2019/0347463 A1* | 11/2019 | Lee | G06V 40/1318 |
| 2022/0147603 A1* | 5/2022 | Liu | G06V 40/10 |
| 2022/0198863 A1* | 6/2022 | Ho | G07C 9/37 |
| 2023/0291955 A1* | 9/2023 | Kim | H04N 21/4227 |

FOREIGN PATENT DOCUMENTS

| | | |
|---|---|---|
| JP | 2015184717 A | 10/2015 |
| JP | 2017504853 A | 2/2017 |

* cited by examiner

FIG.3A
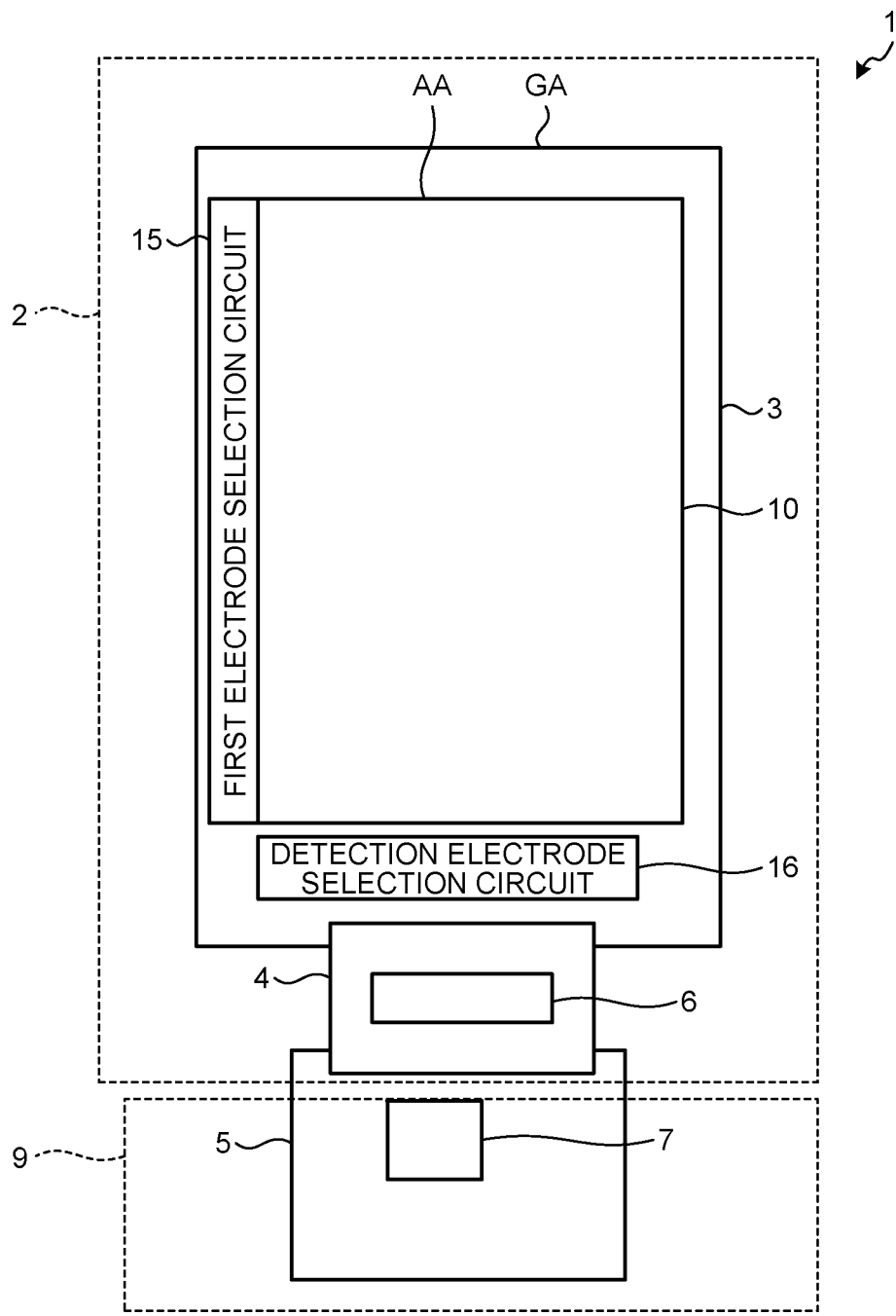
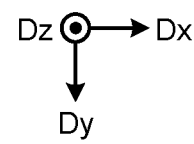

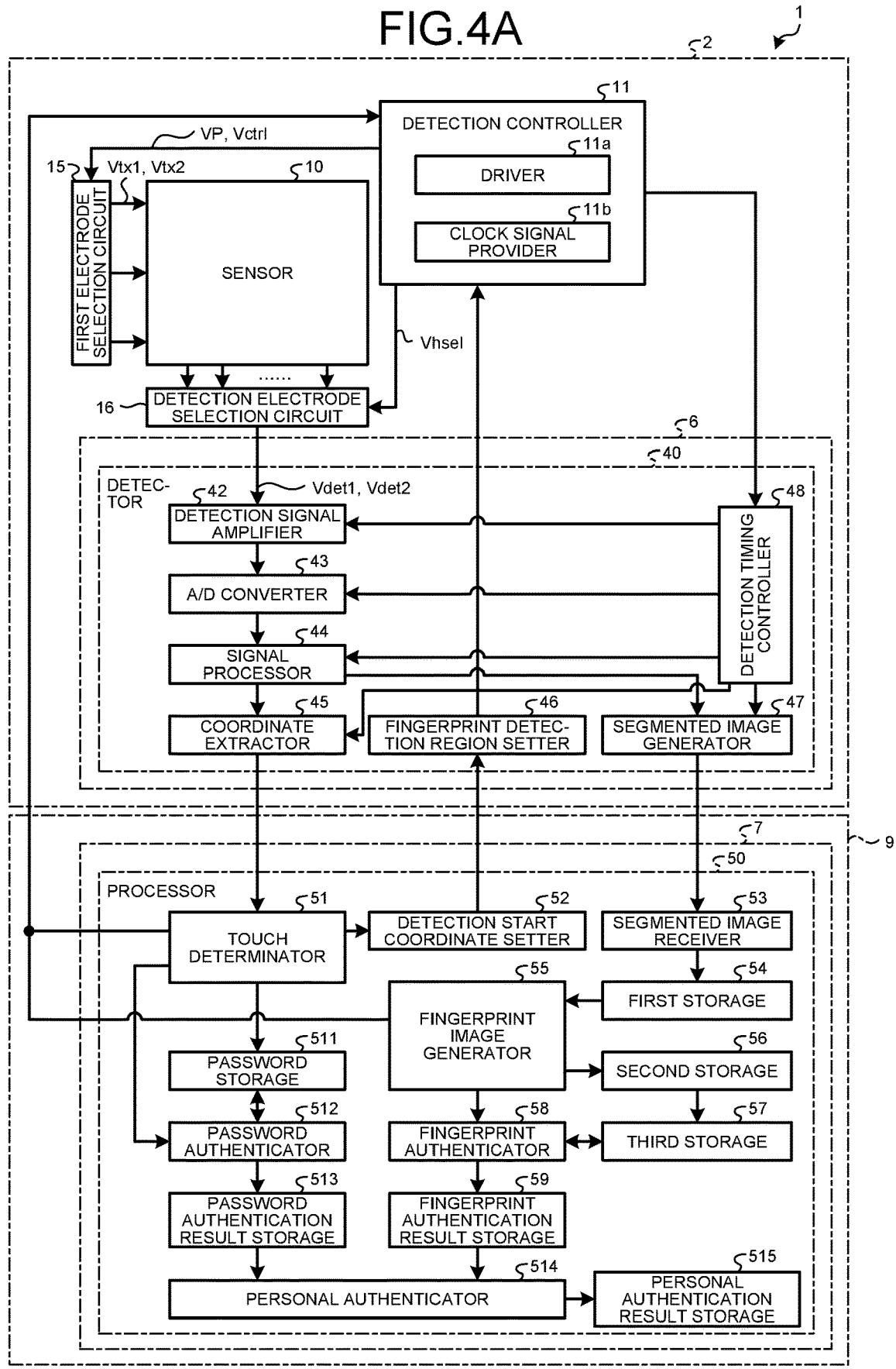

FIG.14
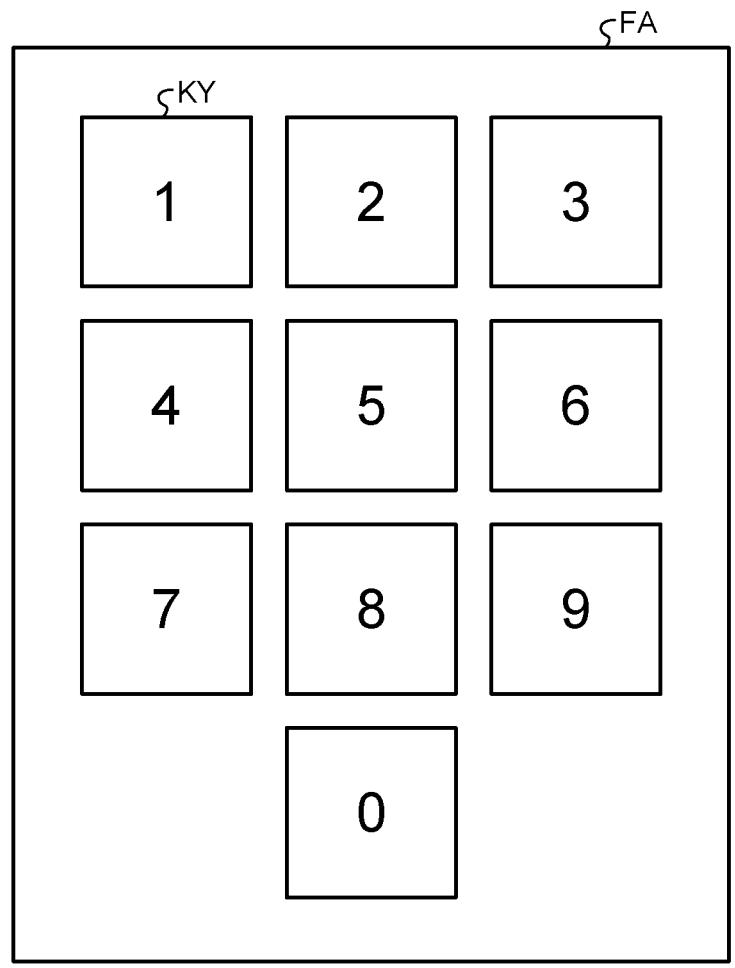
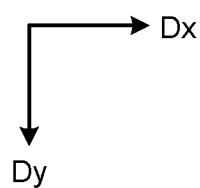

PERSONAL AUTHENTICATION SYSTEM, PERSONAL AUTHENTICATION DEVICE, DISPLAY DEVICE, AND PERSONAL AUTHENTICATION METHOD

CROSS-REFERENCE TO RELATED APPLICATIONS

This application claims the benefit of priority from Japanese Patent Application No. 2020-218840 filed on Dec. 28, 2020 and International Patent Application No. PCT/JP2021/048693 filed on Dec. 27, 2021, the entire contents of which are incorporated herein by reference.

BACKGROUND

1. Technical Field

The present disclosure relates to a personal authentication system, a personal authentication device, a display device, and a personal authentication method.

2. Description of the Related Art

Personal authentication with a password is considered to have a high security level as an existing personal authentication method. However, in personal authentication with a password, unauthorized access by impersonation is concerned because authentication can be made with any person who knows the password. Thus, password authentication can be combined with biometric authentication with a fingerprint, a face, or the like to reinforce security, but a plurality of authentication methods potentially spoils user convenience. For example, in a disclosed personal authentication method, password authentication and fingerprint authentication are combined to reinforce security by detecting a fingerprint on a key through which a user performs inputting.

In password inputting, a touch on a key is maintained for an extremely short time. Thus, with the above-described conventional technology, a fingerprint cannot be read at high accuracy, and authentication potentially fails although a fingerprint image is registered.

For the foregoing reasons, there is a need for a personal authentication system, a personal authentication device, a display device, and a personal authentication method that can achieve both security reinforcement and authentication accuracy improvement without degradation of convenience.

SUMMARY

According to an aspect of the present disclosure, a personal authentication system includes: a detection device having a first period in which detection of a detection target body in contact with or in proximity to a sensor is performed and a second period in which detection of asperities on a surface of the detection target body is performed; and a control device configured to perform processing in accordance with an output from the detection device. The detection device has, as input keys for a password, a plurality of first regions in a detection region of the sensor. The detection device is configured to allocate mutually different segmented regions in a second region having center coordinates at touch detection coordinates detected in the first region in the first period for each key inputting of the password, and output a segmented image acquired in the segmented region in the second period to the control device for each key inputting of the password. The control device is configured to generate a fingerprint image by synthesizing the segmented images acquired in the respective key inputtings of the password.

According to an aspect of the present disclosure, a personal authentication device includes: a detector having a first period in which detection of a detection target body in contact with or in proximity to a sensor is performed and a second period in which detection of asperities on a surface of the detection target body is performed; and a processor configured to perform processing in accordance with an output from the detector. The detector has a plurality of first regions as input keys for a password in a detection region of the sensor. The detector is configured to allocate mutually different segmented regions in a second region having center coordinates at touch detection coordinates detected in the first region in the first period for each key inputting of the password, and output a segmented image acquired in the segmented region in the second period to the processor for each key inputting of the password. The processor is configured to generate a fingerprint image by synthesizing the segmented images acquired in the respective key inputtings of the password.

According to an aspect of the present disclosure, a display device includes: the personal authentication device and a display panel in which a display region for displaying an image is provided so as to overlap the detection region of the personal authentication device.

According to an aspect of the present disclosure, a personal authentication method in which a first period in which detection of a detection target body in contact with or in proximity to a sensor is performed and a second period in which detection of asperities on a surface of the detection target body is performed are provided, and a plurality of first regions as input keys for a password are provided in a detection region of the sensor, the personal authentication method including: allocating mutually different segmented regions in a second region having center coordinates at touch detection coordinates detected in the first region in the first period in each key inputting of the password, and generating a fingerprint image by synthesizing a plurality of segmented images acquired in the segmented regions in the second period in the respective key inputtings of the password.

BRIEF DESCRIPTION OF THE DRAWINGS

FIG. 3A is a plan view illustrating the personal authentication system according to the embodiment;

FIG. 4A is a block diagram illustrating an exemplary configuration of a personal authentication system according to a first embodiment;

FIG. 14 is a diagram illustrating an exemplary detection region in a personal authentication method according to the first embodiment;

DETAILED DESCRIPTION

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate. What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

Figure 1:
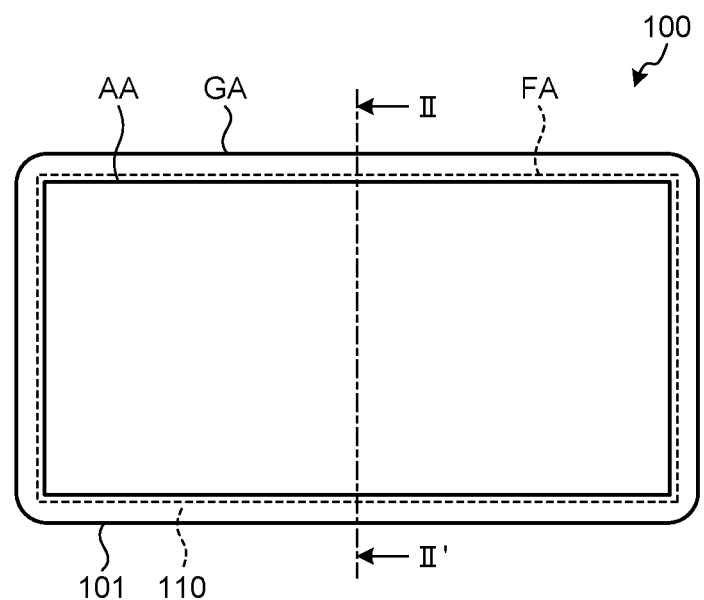
FIG. 1 is a plan view of a display device including a detection device included in a personal authentication system according to an embodiment.
Figure 2:
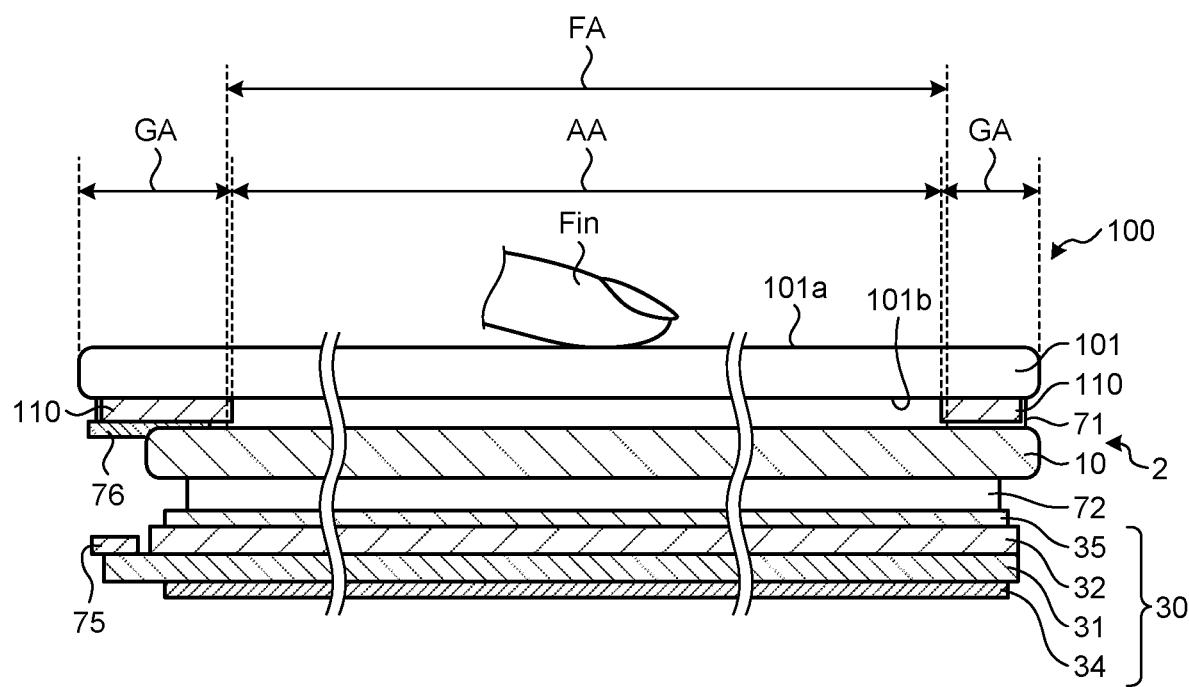
FIG. 2 is a sectional view taken along line II-II' in FIG. 1.

FIG. 1 is a plan view of a display device including a detection device included in a personal authentication system according to an embodiment. FIG. 2 is a sectional view taken along line II-II' in FIG. 1. As illustrated in FIGS. 1 and 2, a display device 100 of the present embodiment includes a display region AA, a frame region GA, and a detection region FA. The display region AA is a region in which an image on a display panel 30 is displayed. The frame region GA is a region outside the display region AA. The detection region FA is a region in which detection of asperities on a surface of a finger or the like in contact therewith or in proximity thereto is performed. The detection region FA is provided over the entire surface of the display region AA.

As illustrated in FIG. 2, the display device 100 of the present embodiment includes a cover member 101, a detection device 2, and the display panel 30. The cover member 101 is a plate member having a first surface 101a and a second surface 101b on a side opposite the first surface 101a. The first surface 101a of the cover member 101 is a detection surface of the detection device 2, and when a detection target body contacts the detection surface, the planar coordinate position of the detection target body on the detection surface is detected, and also asperities on the surface of the detection target body are detected. In the present embodiment, the detection target body is a finger of a user, and the asperities on the surface of the detection target body include a fingerprint. The first surface 101a of the cover member 101 is a display surface on which an image on the display panel 30 is displayed, and also serves as an observation surface on which the user observes the image. The display panel 30 and a sensor 10 of the detection device 2 are provided on the second surface 101b side of the cover member 101. The cover member 101 is a member for protecting the sensor 10 and the display panel 30 and is provided to cover the sensor 10 and the display panel 30. The cover member 101 is, for example, a glass substrate or a resin substrate.

The cover member 101, the sensor 10, and the display panel 30 are each not limited to a rectangular shape in plan view but may each have a circular shape, an elliptical shape, or an irregular shape in which part of any of these outer shapes is omitted. The cover member 101 may be different in the outer shape from the sensor 10 and the display panel 30; for example, the cover member 101 may have a circular shape and the sensor 10 and the display panel 30 may have a regular polygonal shape. The cover member 101 is not limited to a flat plate shape but may have a configuration in which, for example, the display region AA is a curved surface or the frame region GA curves toward the display panel 30 side; that is, a curved surface display having a curved surface can be employed.

As illustrated in FIGS. 1 and 2, a decorative layer 110 is provided on the second surface 101b of the cover member 101 in the frame region GA. The decorative layer 110 is a colored layer having an optical transmittance smaller than that of the cover member 101. The decorative layer 110 can inhibit visual recognition of wiring, circuits, and the like overlapping the frame region GA from being visually recognized by a viewer. In the example illustrated in FIG. 2, the decorative layer 110 is provided on the second surface 101b, but may be provided on the first surface 101a. The decorative layer 110 is not limited to a single layer but may have a structure in which a plurality of layers are stacked.

The detection device 2 includes the sensor 10 configured to detect asperities on a surface of a finger Fin or the like in contact with or in proximity to the first surface 101a of the cover member 101. As illustrated in FIG. 2, the sensor 10 of the detection device 2 is provided on the display panel 30. Specifically, the sensor 10 is provided between the cover member 101 and the display panel 30 and overlaps the display panel 30 when viewed in a direction orthogonal to the first surface 101a. The sensor 10 is coupled to a flexible printed board 76 through which a detection signal from the sensor 10 can be output to the outside.

One surface of the sensor 10 is bonded to the cover member 101 with a bonding layer 71 interposed therebetween. The other surface of the sensor 10 is bonded to a polarization plate 35 of the display panel 30 with a bonding layer 72 interposed therebetween. The bonding layer 71 is, for example, an optical transparent resin (optical clear resin (OCR) or liquid optically clear adhesive (LOCA)) that is a liquid UV curing resin. The bonding layer 72 is, for example, an optical adhesive film (optical clear adhesive (OCA)).

The display panel 30 includes a first substrate 31, a second substrate 32, a polarization plate 34 provided on the lower side of the first substrate 31, and the polarization plate 35 provided on the upper side of the second substrate 32. A flexible printed board 75 is coupled to the first substrate 31. A liquid crystal display element as a display functional layer is provided between the first substrate 31 and the second substrate 32. In other words, the display panel 30 is a liquid crystal panel. The display panel 30 is not limited thereto but may be, for example, an organic EL display panel (organic light emitting diode (OLED)) or an inorganic EL display (micro LED or mini LED). Alternatively, the display panel may be a liquid crystal display panel (liquid crystal display (LCD)) in which a liquid crystal element is used as a display element, or an electrophoretic display panel (electrophoretic display (EPD)) in which an electrophoretic element is used as a display element.

As illustrated in FIG. 2, the sensor 10 is disposed at a position closer to the cover member 101 than the display panel 30 in a direction orthogonal to the second surface 101b of the cover member 101. Thus, for example, the distance between a detection electrode and the first surface 101a as the detection surface can be reduced as compared to a configuration in which a detection electrode for fingerprint detection is provided integrally with the display panel 30. Consequently, it is possible to improve detection performance with the display device 100 including the detection device 2 of the present embodiment.

The display device 100 has a configuration of what is called an out-cell type in which the sensor 10 and the display panel 30 are independent from each other, but may have a configuration of what is called an in-cell type or an on-cell type in which some substrates or some electrodes of the sensor 10 and the display panel 30 are shared with each other.

First Embodiment

FIG. 3A is a plan view illustrating a personal authentication system according to the embodiment. As illustrated in FIG. 3A, this personal authentication system 1 includes the detection device 2 and a control device 9. The detection device 2 includes a substrate 3 and a wiring substrate 4. The control device 9 includes a control board 5. The control board 5 is electrically coupled to the substrate 3 through the wiring substrate 4.

The substrate 3 has the detection region FA and the frame region GA described above. The sensor 10 is provided in the detection region FA. A first electrode selection circuit 15 and a detection electrode selection circuit 16 are provided in the frame region GA.

A detection circuit 6 is provided at the wiring substrate 4. The detection circuit 6 is provided in, for example, a detection IC.

A control circuit 7 is provided at the control board 5. The control circuit 7 is provided at a host IC formed by, for example, a field programmable gate array (FPGA). The control circuit 7 controls detection operation of the sensor 10 by supplying control signals to the sensor 10, the first electrode selection circuit 15, the detection electrode selection circuit 16, and the detection circuit 6. One or both of the first electrode selection circuit 15 and the detection electrode selection circuit 16 may be provided in the detection circuit 6 or the control circuit 7.

The first electrode selection circuit 15 is provided in a region extending in a second direction Dy in the frame region GA. The detection electrode selection circuit 16 is provided in a region extending in a first direction Dx in the frame region GA and is provided between the sensor 10 and the detection circuit 6.

The first direction Dx is a direction in a plane parallel to the substrate 3. The second direction Dy is another direction in the plane parallel to the substrate 3 and is orthogonal to the first direction Dx. The second direction Dy does not necessarily need to be orthogonal to the first direction Dx but may intersect the first direction Dx. A third direction Dz is a direction orthogonal to the first direction Dx and the second direction Dy and is the normal direction of the substrate 3.

Figure 3B:
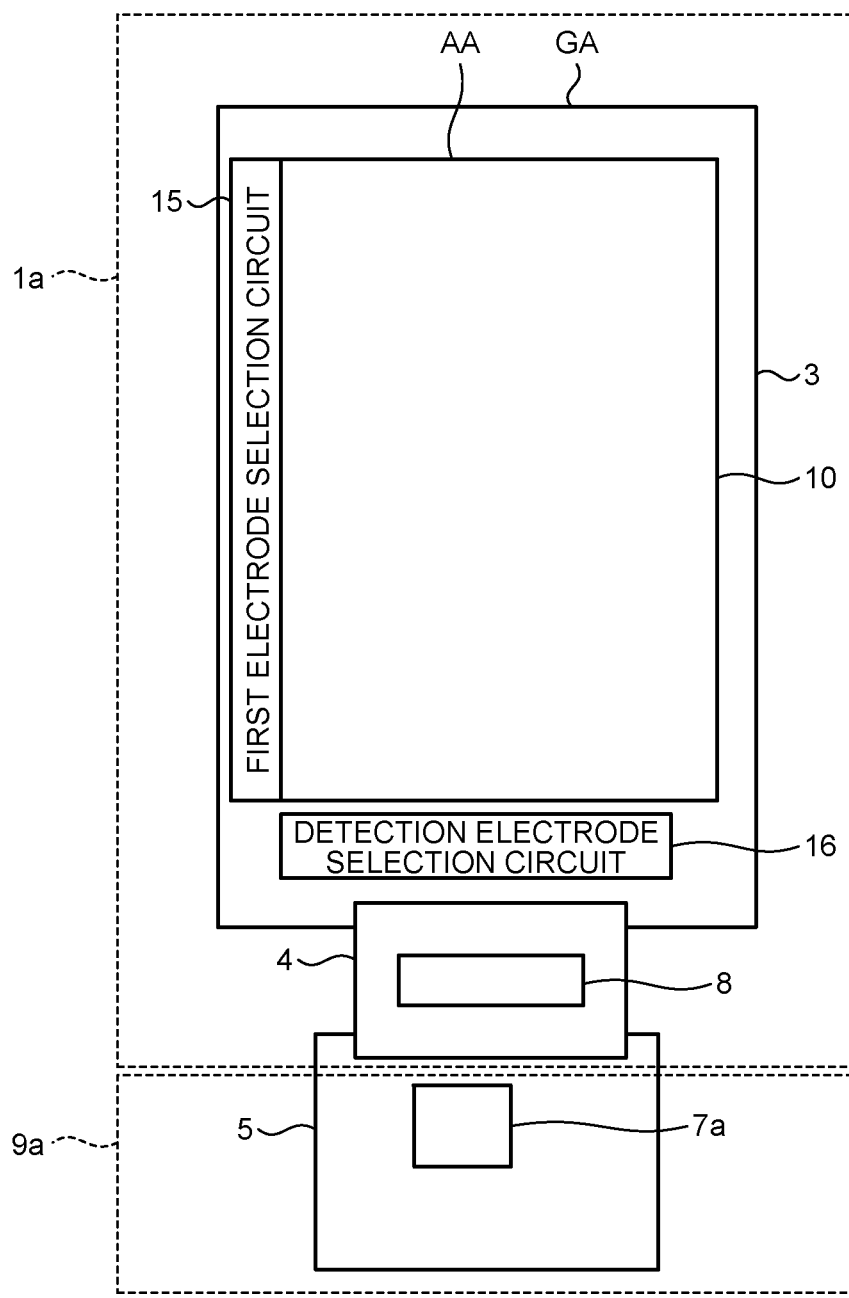
FIG. 3B is a plan view illustrating a personal authentication device according to the embodiment.

FIG. 3B is a plan view illustrating a personal authentication device according to the embodiment. As illustrated in FIG. 3B, this personal authentication device 1a corresponds to the detection device 2 of the personal authentication system 1 illustrated in FIG. 3A.

In the personal authentication device 1a illustrated in FIG. 3B, a personal authentication circuit 8 is provided at the wiring substrate 4. The personal authentication circuit 8 is provided at, for example, the detection IC.

In the example illustrated in FIG. 3B, a control circuit 7a is provided at the control board 5 of a control device 9a. Different functions are allocated to the detection circuit 6 of the personal authentication system 1 illustrated in FIG. 3A and the personal authentication circuit 8 of the personal authentication device 1a illustrated in FIG. 3B.

The following describes detailed configurations of the personal authentication system 1 and the personal authentication device 1a.

FIG. 4A is a block diagram illustrating an exemplary configuration of a personal authentication system according to a first embodiment. As illustrated in FIG. 4A, the personal authentication system 1 includes the detection device 2 and the control device 9 as a host device of the detection device 2. The detection device 2 includes the sensor 10, a detection controller 11, the first electrode selection circuit 15, the detection electrode selection circuit 16, and the detection circuit 6 including a detector 40. The control device 9 includes the control circuit 7 including a processor 50.

Figure 4B:
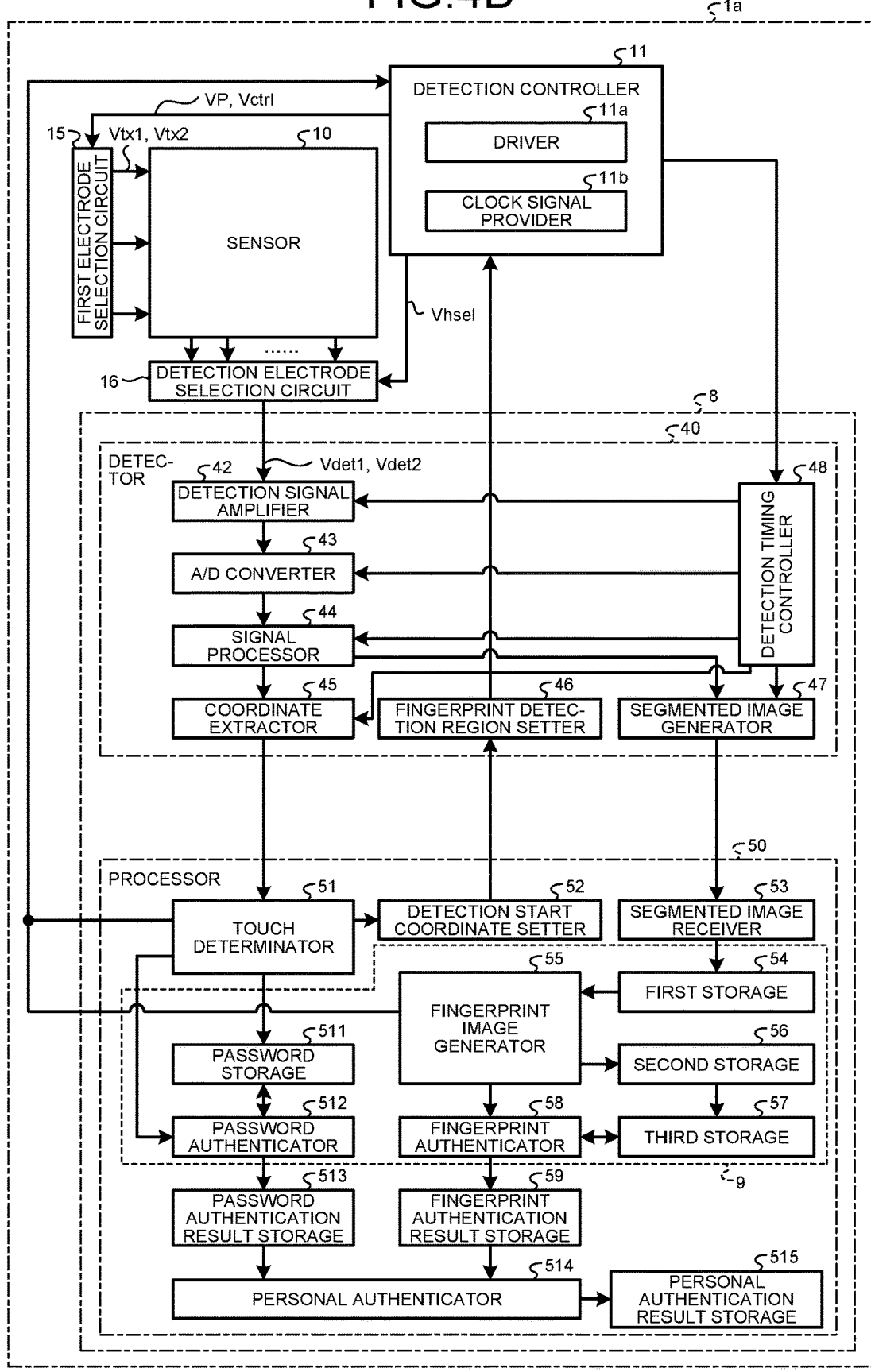
FIG. 4B is a block diagram illustrating an exemplary configuration of a personal authentication device according to the first embodiment.

FIG. 4B is a block diagram illustrating an exemplary configuration of a personal authentication device according to the first embodiment. As illustrated in FIG. 4B, the personal authentication device 1a includes the sensor 10, the detection controller 11, the first electrode selection circuit 15, the detection electrode selection circuit 16, and the personal authentication circuit 8 including the detector 40 and the processor 50. Specifically, in the personal authentication device 1a illustrated in FIGS. 3B and 4B, the personal authentication circuit 8 has functions of the processor 50 included in the control circuit 7 of the personal authentication system 1 illustrated in FIGS. 3A and 4A. Components in the following description are applicable to any of the personal authentication system 1 illustrated in FIGS. 3A and 4A and the personal authentication device 1a illustrated in FIGS. 3B and 4B.

The sensor 10 performs detection in accordance with a second drive signal Vtx2 supplied from the first electrode selection circuit 15. Specifically, a plurality of first electrodes Tx (refer to FIG. 6) are individually or simultaneously selected through operation of the first electrode selection circuit 15. Then, the first electrode selection circuit 15 supplies, to each of the selected first electrodes Tx, the second drive signal Vtx2 with a phase determined based on a predetermined sign. The sensor 10 converts a variation in asperities on a surface of the finger Fin or a hand in contact therewith or in proximity thereto into a variation in an electric signal based on the principle of mutual-capacitive detection and outputs the electric signal to the detection circuit 6.

The sensor 10 can also detect the position (coordinates) of the finger Fin or the like in contact therewith or in proximity thereto in accordance with a first drive signal Vtx1 supplied from the first electrode selection circuit 15. The sensor 10 performs the detection in the entire detection region FA by scanning the first electrodes Tx for each first electrode block including a plurality of first electrodes Tx or at the ratio of one in some first electrodes Tx. Based on the principle of mutual-capacitive detection, the sensor 10 outputs, to the detection circuit 6, a variation in an electric signal due to existence or nonexistence of the finger Fin in contact with the detection surface. The above-described touch detection on the detection surface in accordance with the first drive signal Vtx1 only needs to detect and identify the coordinates of the finger and thus has a detection resolution lower than that of the detection in accordance with the second drive signal Vtx2.

The detection controller 11 is a circuit configured to supply a control signal to each of the first electrode selection circuit 15, the detection electrode selection circuit 16, and the detector 40 to control operation of these components. The detection controller 11 includes a driver 11a and a clock signal provider 11b. The driver 11a supplies a power voltage VP to the first electrode selection circuit 15. The detection controller 11 supplies various kinds of control signals Vctrl to the first electrode selection circuit 15 based on a clock signal from the clock signal provider 11b.

The first electrode selection circuit 15 is a circuit configured to simultaneously or individually select more than one of the first electrodes Tx based on the various kinds of control signals Vctrl. The first electrode selection circuit 15 supplies the first drive signal Vtx1 or the second drive signal Vtx2 to the selected first electrodes Tx based on the various kinds of control signals Vctrl and one or a plurality of power voltages VP. The first drive signal Vtx1 and the second drive signal Vtx2 include not only signals that have waveforms mutually different in wavelength and/or amplitude but also signals that have the same waveform but are respectively output to the sensor 10 in mutually different periods. The first electrode selection circuit 15 changes the selection state of the first electrodes Tx, whereby the sensor 10 can operate in a first detection mode M1, a second detection mode M2, a third detection mode M3, and a fourth detection mode M4 (refer to FIGS. 10 to 13).

Figure 6:
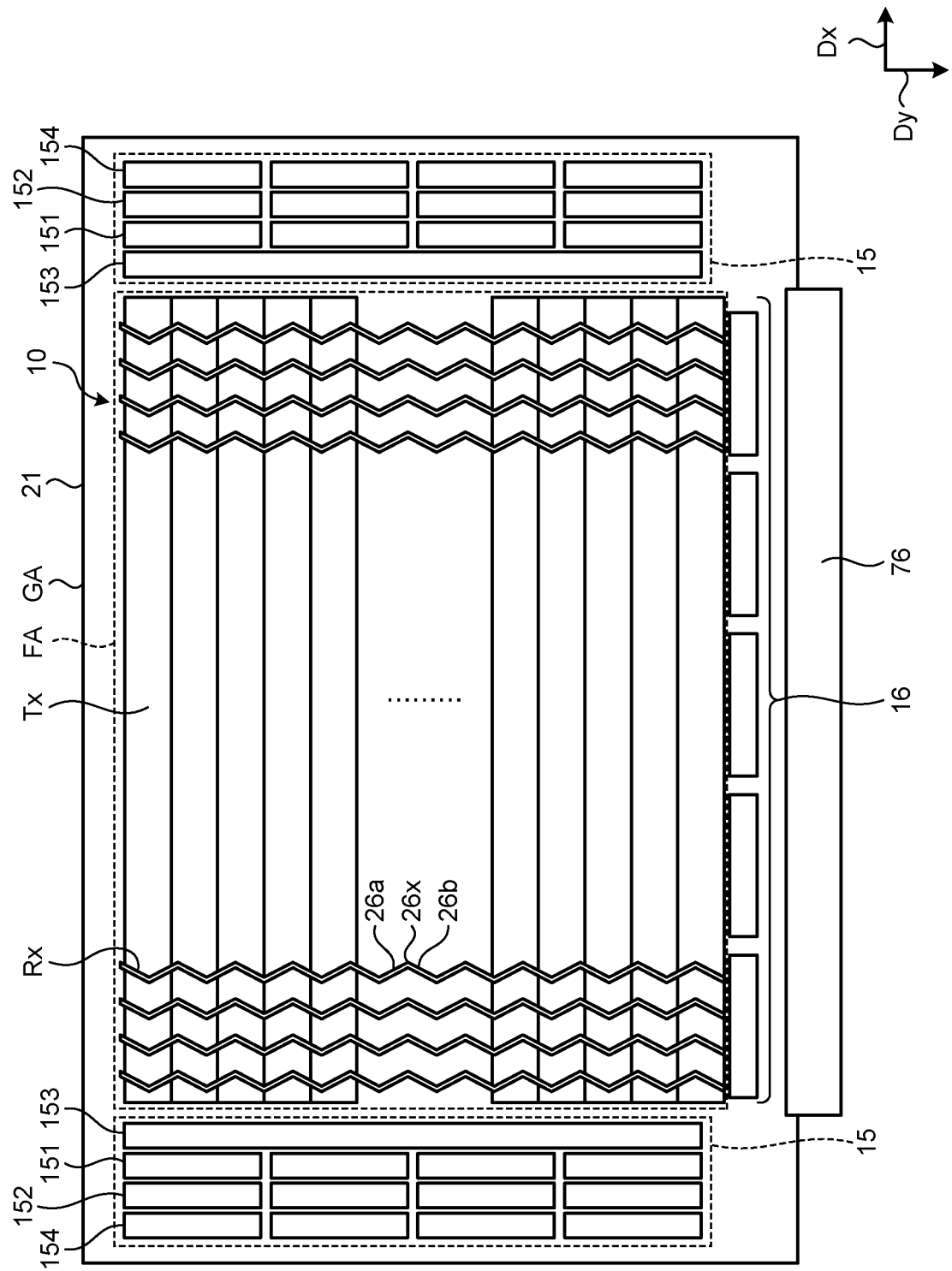
FIG. 6 is a plan view of a sensor substrate.

The detection electrode selection circuit 16 is a switch circuit configured to simultaneously select a plurality of second electrodes Rx (refer to FIG. 6). The detection electrode selection circuit 16 selects second electrodes Rx based on a second electrode selection signal Vhse1 supplied from the detection controller 11 and couples the selected second electrodes Rx to the detection circuit 6.

The detector 40 is a circuit configured to detect a touch of a finger on the detection surface at a relatively large pitch and to detect the fingerprint of the finger at a relatively small pitch, based on a control signal supplied from the detection controller 11 and a first detection signal Vdet1 and a second detection signal Vdet2 supplied from the sensor 10. Components of the detector 40 operate in synchronization based on a control signal supplied from the detection controller 11. The detector 40 includes, as the components, a detection signal amplifier 42, an A/D converter 43, a signal processor 44, a coordinate extractor 45, a fingerprint detection region setter 46, a segmented image generator 47, and a detection timing controller 48. When the first detection signal Vdet1 and the second detection signal Vdet2 do not need to be distinguished from each other in the following description, they are simply referred to as detection signals Vdet.

Based on a control signal supplied from the detection controller 11, the detection timing controller 48 controls the detection signal amplifier 42, the A/D converter 43, the signal processor 44, the coordinate extractor 45, and the segmented image generator 47 to operate them in synchronization.

The detection signal amplifier 42 amplifies the detection signals Vdet. The A/D converter 43 converts an analog signal output from the detection signal amplifier 42 into a digital signal.

The signal processor 44 performs predetermined decoding processing based on an output signal from the A/D converter 43. Specifically, the signal processor 44 performs processing of obtaining a differential signal (absolute value $|\Delta V|$) of the detection signals Vdet. The signal processor 44 compares the absolute value $|\Delta V|$ with a predetermined threshold voltage and produces an output.

The coordinate extractor 45 extracts the coordinates (hereinafter also referred to as a "touch detection coordinates") of the detection target body in contact with or in proximity to the sensor 10 based on the results of the decoding processing by the signal processor 44 and outputs the touch detection coordinates to the processor 50.

The fingerprint detection region setter 46 sets a region in which detection is to be performed based on detection start coordinates output from the processor 50. The detection start coordinates and the region in which detection is to be performed will be described later.

The segmented image generator 47 extracts asperities on a surface of the detection target body based on the result of the decoding processing by the signal processor 44 and generates segmented images. The present disclosure is not limited to this segmented image generation method. The segmented images will be described later.

In the present embodiment, the personal authentication system 1 illustrated in FIG. 4A and the personal authentication device 1a illustrated in FIG. 4B each detect the finger Fin in contact with the detection surface of the sensor 10 based on the principle of capacitive detection (hereinafter referred to as "touch detection"). In addition, the personal authentication system 1 and the personal authentication device 1a each detect a fingerprint by detecting asperities on a surface of the finger Fin in contact with the sensor 10 based on the principle of capacitive detection (hereinafter referred to as "fingerprint detection").

In capacitive touch detection operation, a state in which capacitance change occurs due to contact of the finger Fin is referred to as a "touch state" below. In addition, a state in which no capacitance change occurs due to the finger Fin is referred to as a "non-touch state" below.

Figure 5:
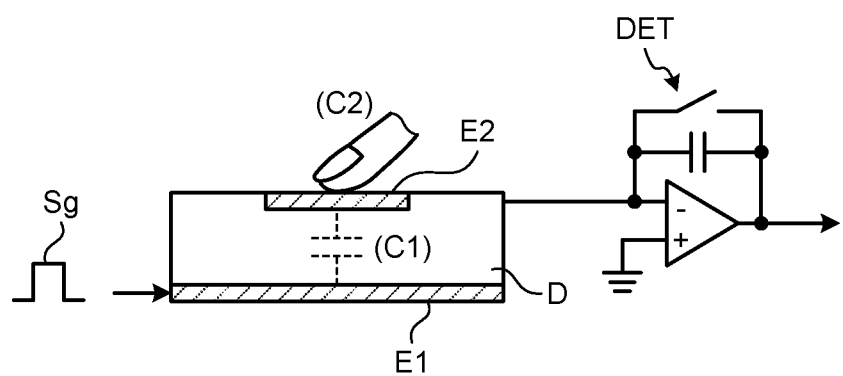
FIG. 5 is an explanatory diagram for description of the fundamental principle of mutual-capacitive touch detection.

The following describes the fundamental principle of mutual-capacitive touch detection by the personal authentication system 1 and the personal authentication device 1a of the present embodiment with reference to FIG. 5. FIG. 5 is an explanatory diagram for description of the fundamental principle of mutual-capacitive touch detection. FIG. 5 also illustrates the detection circuit.

As illustrated in FIG. 5, a capacitive element C1 includes a pair of electrodes, namely a drive electrode E1 and a detection electrode E2, disposed opposite to each other with a dielectric D interposed therebetween. The capacitive element C1 is subjected to an electric field (not illustrated) formed between facing surfaces of the drive electrode E1 and the detection electrode E2 as well as an electric field extending from end parts of the drive electrode E1 toward the upper surface of the detection electrode E2. One end of the capacitive element C1 is coupled to an alternating-current signal source (drive signal source), and the other end thereof is coupled to a voltage detector DET. The voltage detector DET is, for example, an integration circuit included in the detector 40 illustrated in FIG. 4.

An alternating-current square wave Sg at a predetermined frequency (for example, several kHz to several hundreds kHz) is applied from the alternating-current signal source to the drive electrode E1 (one end of the capacitive element C1). Current in accordance with the capacitance value of the capacitive element C1 flows to the voltage detector DET. The voltage detector DET converts a variation in current corresponding to the alternating-current square wave Sg into a variation in voltage.

Fringe lines of electric force between the drive electrode E1 and the detection electrode E2 are interrupted by a conductor (finger) as electrostatic capacitance C2 formed by the finger is in contact with the detection electrode E2 or comes as close to the detection electrode E2 as it can be identified as being in contact therewith. Thus, the capacitive element C1 acts as a capacitive element having a capacitance value that gradually decreases from the capacitance value in the non-contact state as it comes closer thereto.

The amplitude of a voltage signal output from the voltage detector DET decreases from the amplitude in the non-contact state as the finger Fin approaches the contact state. The absolute value $|\Delta V|$ of this voltage difference changes depending on influence of the finger Fin in contact with the detection surface. The detector 40 determines contact/non-contact of the finger Fin on the detection surface by comparing the absolute value $|\Delta V|$ with the predetermined threshold voltage. In the present embodiment, such determination is performed by any one of the signal processor 44 and the coordinate extractor 45 of the detector 40 or by both thereof in cooperation.

The detector 40 determines asperities on the finger Fin or the like based on the absolute value $|\Delta V|$. This asperity determination may be performed by comparing the absolute value $|\Delta V|$ with a predetermined threshold, and the threshold may be different from a threshold for determining contact/proximity of the finger Fin or may include a plurality of thresholds. In the present embodiment, such determination is performed by the signal processor 44 of the detector 40. In this manner, the detector 40 can perform the touch detection and the fingerprint detection based on the fundamental principle of mutual-capacitive touch detection.

In the present disclosure, a fingerprint image is data serving as surface information generated based on outputs from the second electrodes Rx and is different from touch coordinates (point information) that specifies one or a plurality of coordinate positions on the detection surface. More specifically, the fingerprint image is an aggregate of detection data in a plurality of detection unit regions, and each detection data includes, for example, the coordinates of the corresponding detection unit region and a result of asperity determination at the coordinate position. In the asperity determination, the threshold as described above is used as a border value, and a binary determination as the comparison result with the threshold can be employed. For example, when the detection result is larger than the threshold, it indicates concavity; and when the detection result is smaller than the threshold, it indicates convexity. Alternatively, the fingerprint image may be data obtained by more finely digitizing an actual detection signal based on a plurality of thresholds. Alternatively, the fingerprint image may be data including RAW data, which is not processed, of the magnitude of an output signal at each set of coordinates. Such data for each set of coordinates is accumulated to generate two-dimensional surface information.

In the present embodiment, the finger Fin as the detection target body and the fingerprint thereof are detected, but the detection target body is not limited to a finger, and asperities on the detection target body are not limited to a fingerprint.

Figure 7:
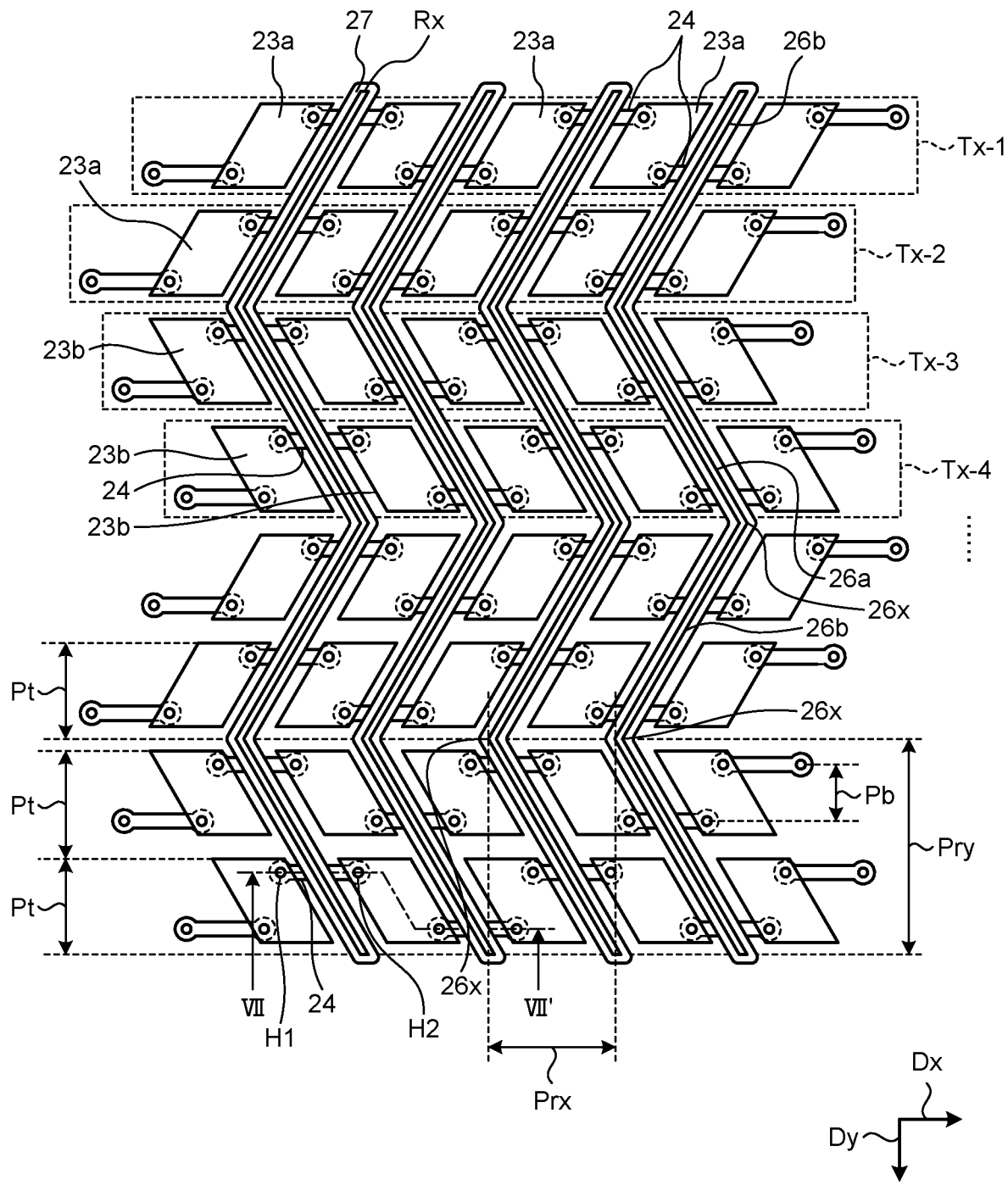
FIG. 7 is an enlarged plan view illustrating part of first and second electrodes.
Figure 8:
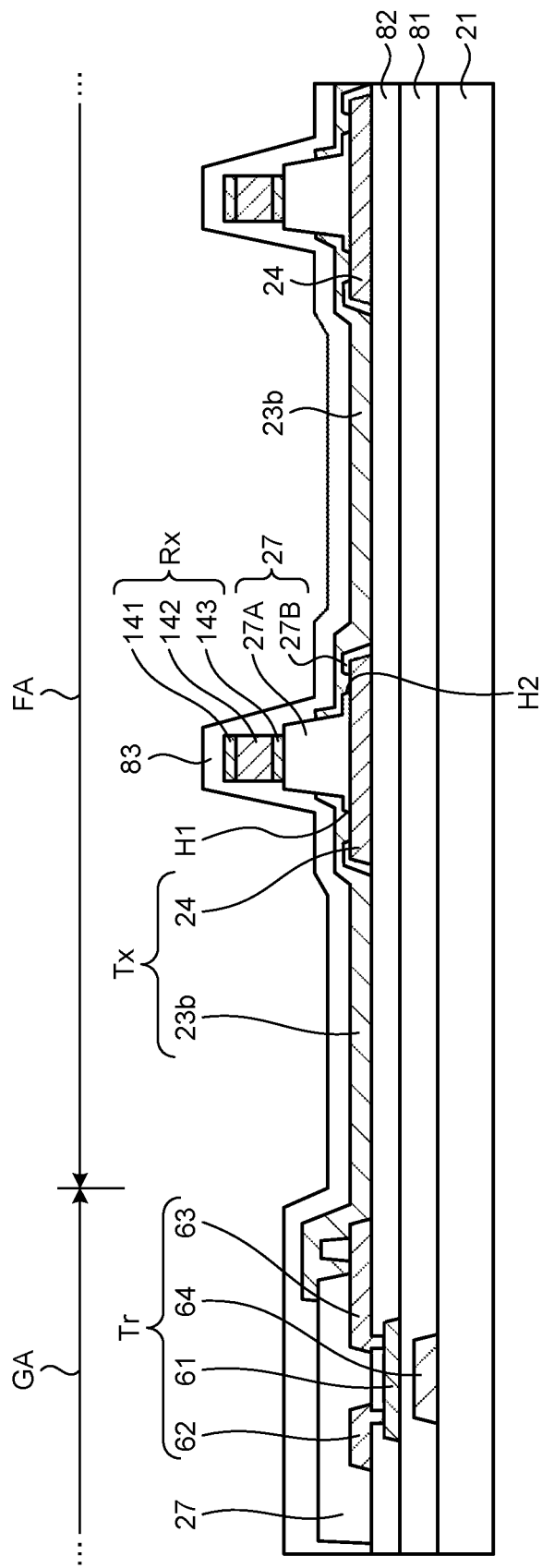
FIG. 8 is a sectional view taken along line VII-VII' in FIG. 7.

The following describes the configurations of the first electrodes Tx and the second electrodes Rx. FIG. 6 is a plan view of a sensor substrate. FIG. 7 is an enlarged plan view illustrating part of the first and second electrodes. FIG. 8 is a sectional view taken along line VII-VII' in FIG. 7.

As illustrated in FIG. 6, the first electrodes Tx and the second electrodes Rx are provided on a sensor substrate 21. The sensor substrate 21 is a light-transmitting glass substrate that can transmit visible light. Alternatively, the sensor substrate 21 may be a light-transmitting resin substrate or resin film made of resin such as polyimide. The sensor 10 is a light-transmitting sensor.

The first electrodes Tx extend in the first direction Dx and are arrayed in the second direction Dy. The second electrodes Rx extend in the second direction Dy and are arrayed in the first direction Dx. The second electrodes Rx extend in a direction intersecting the first electrodes Tx in plan view. Each second electrode Rx is coupled to the flexible printed board 76 provided on a short side of the frame region GA of the sensor substrate 21 through a frame wiring (not illustrated). The first electrodes Tx and the second electrodes Rx are provided in the detection region FA. The first electrodes Tx are made of light-transmitting conductive material such as Indium Tin Oxide (ITO). The second electrodes Rx are made of metallic material such as aluminum or aluminum alloy. The first electrodes Tx may be made of metallic material and the second electrodes Rx may be made of ITO. However, resistance on the detection signals Vdet can be reduced when the second electrodes Rx are made of metallic material.

The first direction Dx is a direction in a plane parallel to the sensor substrate 21 and is, for example, a direction parallel to a side of the detection region FA. The second direction Dy is another direction in the plane parallel to the sensor substrate 21 and is a direction orthogonal to the first direction Dx. The second direction Dy does not necessarily need to be orthogonal to the first direction Dx but may intersect the first direction Dx. In the present specification, "plan view" is view in a direction orthogonal to the sensor substrate 21.

Capacitors are formed at respective intersections of the second electrodes Rx and the first electrodes Tx. When mutual-capacitive touch detection operation is performed at the sensor 10, the first electrode selection circuit 15 selects first electrodes Tx, and supplies the first drive signal Vtx1 or the second drive signal Vtx2 simultaneously to the selected first electrodes Tx. Then, the detection signals Vdet depending on a capacitance change due to asperities on the surface of a finger or the like in a contact state or in a proximity state are output from the second electrodes Rx, and thus, fingerprint detection is performed. Alternatively, the detection signals Vdet depending on a capacitance change due to a finger or the like in a contact state or in a proximity state are output from the second electrodes Rx, and thus, touch detection is performed.

As illustrated in FIG. 6, various circuits such as the first electrode selection circuit 15 and the detection electrode selection circuit 16 are provided in the frame region GA of the sensor substrate 21. The first electrode selection circuit 15 includes a first selection circuit 151, a second selection circuit 152, a third selection circuit 153, and a first electrode block selection circuit 154. However, this configuration is merely exemplary. At least some of the various circuits may be included in an integrated circuit (IC) for detection mounted on the flexible printed board 76. Alternatively, at least some of the various circuits may be provided on an external control board. The first selection circuit 151, the second selection circuit 152, the third selection circuit 153, and the first electrode block selection circuit 154 do not necessarily need to be each provided as an individual circuit. The first electrode selection circuit 15 may be provided as one integrated circuit having functions of the first selection circuit 151, the second selection circuit 152, the third selection circuit 153, and the first electrode block selection circuit 154. The first electrode selection circuit 15 may be a semiconductor integrated circuit (IC).

The following describes the configurations of the first electrodes Tx and the second electrodes Rx. As illustrated in FIG. 7, each second electrode Rx is a zigzag line and has a longitudinal direction in the second direction Dy as a whole. For example, each second electrode Rx includes a plurality of first straight parts 26a, a plurality of second straight parts 26b, and a plurality of bent parts 26x. The second straight parts 26b extend in a direction intersecting the first straight parts 26a. Each bent part 26x couples a first straight part 26a and the corresponding second straight part 26b.

The first straight parts 26a extend in a direction intersecting the first direction Dx and the second direction Dy. The second straight parts 26b extend in another direction intersecting the first direction Dx and the second direction Dy. Each first straight part 26a and the corresponding second straight part 26b are symmetrically disposed with respect to a virtual line (not illustrated) parallel to the first direction Dx. In each second electrode Rx, the first straight parts 26a and the second straight parts 26b are alternately coupled in the second direction Dy.

The disposition interval of the bent parts 26x in the second direction Dy in each second electrode Rx is represented by Pry. The disposition interval of the bent parts 26x of adjacent second electrodes Rx in the first direction Dx is represented by Prx. In the present embodiment, it is preferable to satisfy, for example, Prx<Pry. Each second electrode Rx is not limited to a zigzag shape but may have another shape such as a wavy line shape or a straight line shape.

As illustrated in FIG. 7, the first electrodes Tx-1, Tx-2, Tx-3, Tx-4, . . . each include a plurality of electrode parts 23a or 23b and a plurality of coupling parts 24. When the first electrodes Tx-1, Tx-2, Tx-3, Tx-4, . . . do not need to be distinguished from one another in the following description, they are simply referred to as the first electrodes Tx.

The first electrodes Tx-1 and Tx-2 intersecting the second straight parts 26b of the second electrodes Rx include the electrode parts 23a having two sides parallel to the second straight parts 26b. The first electrodes Tx-3 and Tx-4 intersecting the first straight parts 26a of the second electrodes Rx include the electrode parts 23b having two sides parallel to the first straight parts 26a. In other words, the electrode parts 23a and 23b are disposed along the second electrodes Rx. With this configuration, each second electrode Rx in a zigzag shape is separated from the corresponding electrode parts 23a and 23b at a constant distance in plan view.

In the first electrodes Tx-1 and Tx-2, the electrode parts 23a are arranged in the first direction Dx and separated from each other. In each first electrode Tx, each coupling part 24 couples adjacent electrode parts 23a. Each second electrode Rx intersects the coupling parts 24 through a gap between adjacent electrode parts 23a in plan view. The first electrodes Tx-3 and Tx-4 have the same configuration. Each second electrode Rx is a metal thin line and has a width in the first direction Dx smaller than the widths of the electrode parts 23a and 23b in the first direction Dx. With such a configuration, the area of overlapping of the first electrodes Tx and the second electrodes Rx is reduced to reduce parasitic capacitance.

The disposition interval of the first electrodes Tx in the second direction Dy is represented by Pt. The disposition interval Pt is about half of the disposition interval Pry of the bent parts 26x of the second electrodes Rx. The disposition interval Pt is not limited thereto and may be other than a half-integer multiple of the disposition interval Pry. The disposition interval Pt is, for example, 50 μm to 100 μm inclusive. In each first electrode Tx, the coupling parts 24 adjacent to each other in the first direction Dx are disposed in a staggered manner with a disposition interval Pb in the second direction Dy. The electrode parts 23a and 23b each have a parallelogram shape but may have another shape. For example, the electrode parts 23a and 23b may each have a rectangular shape, a polygonal shape, or an irregular shape.

The following describes a sectional structure taken along line VII-VII' in FIG. 7. In FIG. 8, a section of the frame region GA is a section of a part including a thin film transistor Tr included in the first electrode selection circuit 15. In FIG. 8, the section taken along line VII-VII' in the detection region FA and the section of the part including the thin film transistor Tr in the frame region GA are schematically connected in order to illustrate the relation between a layer structure of the detection region FA and a layer structure of the frame region GA.

As illustrated in FIG. 8, the thin film transistor Tr is provided in the frame region GA on the sensor substrate 21. The thin film transistor Tr includes a semiconductor layer 61, a source electrode 62, a drain electrode 63, and a gate electrode 64. The gate electrode 64 is provided on the sensor substrate 21. A first inter-layer insulating film 81 is provided on the sensor substrate 21 and covers the gate electrode 64. The gate electrode 64 is made of aluminum (Al), copper (Cu), silver (Ag), molybdenum (Mo), or alloy of these materials. The first inter-layer insulating film 81 is made of a silicon oxide film (SiO), a silicon nitride film (SiN), or a silicon oxidize nitride film (SiON). The first inter-layer insulating film 81 is not limited to a single layer but may be a film of a multilayered structure. For example, the first inter-layer insulating film 81 may be a film of a multilayered structure in which a silicon nitride film is formed on a silicon oxide film.

The semiconductor layer 61 is provided on the first inter-layer insulating film 81. A second interlayer insulating film 82 is provided on the first inter-layer insulating film 81 and covers the semiconductor layer 61. The semiconductor layer 61 is exposed at a bottom part of a contact hole provided in the second interlayer insulating film 82. The semiconductor layer 61 is made of polysilicon or oxide semiconductor. The second interlayer insulating film 82 is made of a silicon oxide film, a silicon nitride film, or a silicon oxidize nitride film. The second interlayer insulating film 82 is not limited to a single layer but may be a film of a multilayered structure. For example, the second interlayer insulating film 82 may be a film of a multilayered structure in which a silicon nitride film is formed on a silicon oxide film.

The source electrode 62 and the drain electrode 63 are provided on the second interlayer insulating film 82. The source electrode 62 and the drain electrode 63 are each coupled to the semiconductor layer 61 through a contact hole provided in the second interlayer insulating film 82. The source electrode 62, the drain electrode 63, and the coupling parts 24 are made of titanium aluminide (TiAl), which is alloy of titanium and aluminum.

In addition, an insulating resin layer 27 and the electrode parts 23b and the coupling parts 24 of the first electrodes Tx are provided on the second interlayer insulating film 82. The resin layer 27 provided in the frame region GA covers the source electrode 62 and the drain electrode 63. The drain electrode 63 is electrically coupled to a first electrode Tx through a contact hole provided in the resin layer 27 provided in the frame region GA.

The resin layer 27 provided in the detection region FA includes a first resin layer 27A and a second resin layer 27B thinner than the first resin layer 27A. The first resin layer 27A covers portions of the coupling parts 24 that are positioned directly below the second electrodes Rx. The second resin layer 27B provided in the detection region FA covers portions of the coupling parts 24 that are positioned directly below the electrode parts 23b.

Contact holes H1 and H2 are provided in the second resin layer 27B. In the detection region FA, outer edges of the electrode parts 23b are coupled to the coupling parts 24 through the contact holes H1 and H2. In this example, the electrode parts 23b are in contact with the second interlayer insulating film 82.

The second electrodes Rx are provided on the first resin layer 27A. Each second electrode Rx includes, for example, a first metal layer 141, a second metal layer 142, and a third metal layer 143. The second metal layer 142 is provided on the third metal layer 143, and the first metal layer 141 is provided on the second metal layer 142. For example, the first metal layer 141 and the third metal layer 143 are made of molybdenum or molybdenum alloy. The second metal layer 142 is made of aluminum or aluminum alloy. Molybdenum or molybdenum alloy, of which the first metal layer 141 is made has a visible light reflective index lower than that of aluminum or aluminum alloy, of which the second metal layer 142 is made. Thus, the second electrodes Rx are not visually recognizable.

An insulating film 83 is provided on the resin layer 27, the electrode parts 23b, and the second electrodes Rx. The insulating film 83 covers the upper and side surfaces of the second electrodes Rx. The insulating film 83 is made of a film having a high refractive index and a low reflective index, such as a silicon nitride film.

With the above-described configuration, the first electrodes Tx and the second electrodes Rx are formed on the same sensor substrate 21. The first electrodes Tx and the second electrodes Rx are provided in different layers with the resin layer 27 as an insulating layer interposed therebetween.

The following describes a personal authentication data acquisition period of the personal authentication system 1 and the personal authentication device 1a according to the present embodiment.

Figure 9:
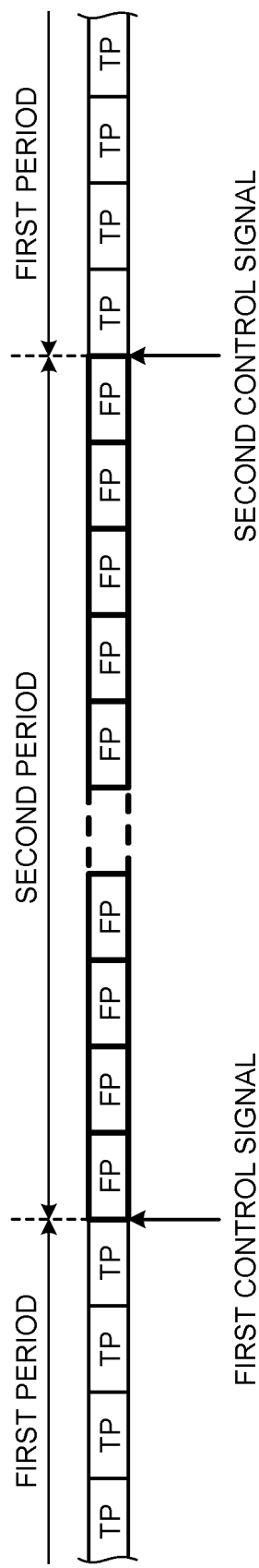
FIG. 9 is a timing chart illustrating exemplary operation of switching between a first period and a second period.

In the present disclosure, the personal authentication data acquisition period of the personal authentication system 1 and the personal authentication device 1a includes a first period and a second period. The first period includes a touch detection period (coordinate detection period) in which touch detection is executed, and the second period includes a fingerprint detection period (surface information detection period) in which fingerprint detection is executed. FIG. 9 is a timing chart illustrating exemplary operation of switching between the first period and the second period. In FIG. 9, TP indicates the touch detection period (coordinate detection period), and FP indicates the fingerprint detection period (surface information detection period).

As illustrated in FIG. 9, the personal authentication system 1 and the personal authentication device 1a according to the present embodiment transition from the first period to the second period based on a first control signal output from the processor 50. The personal authentication system 1 and the personal authentication device 1a according to the present embodiment transition from the second period to the first period based on a second control signal output from the processor 50.

Figure 10:
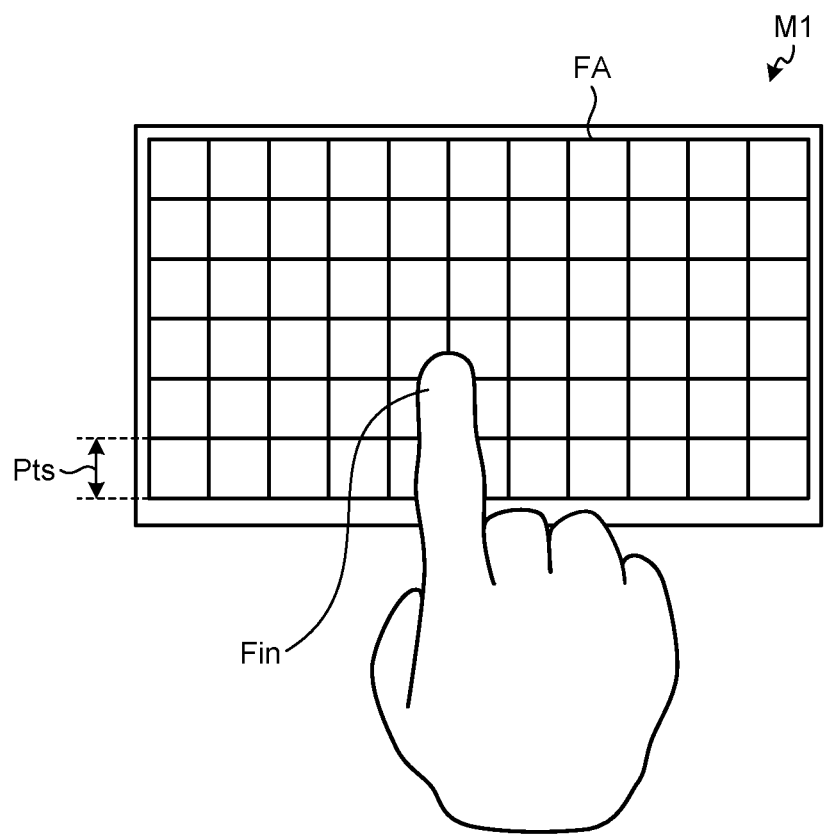
FIG. 10 is a diagram illustrating an exemplary first detection mode.
Figure 11:
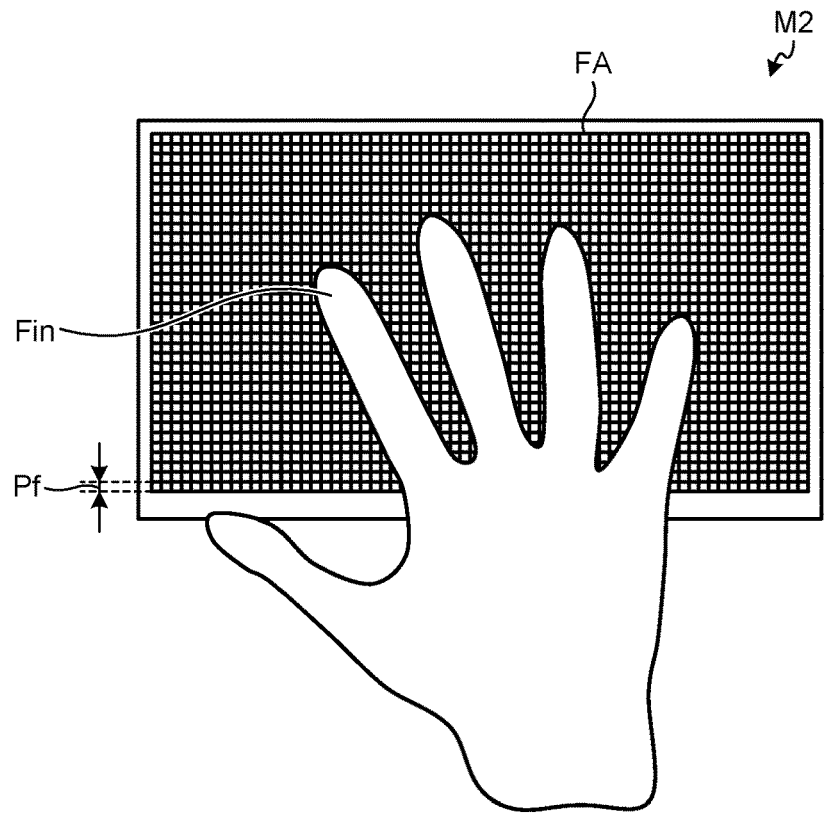
FIG. 11 is a diagram illustrating an exemplary second detection mode.
Figure 12:
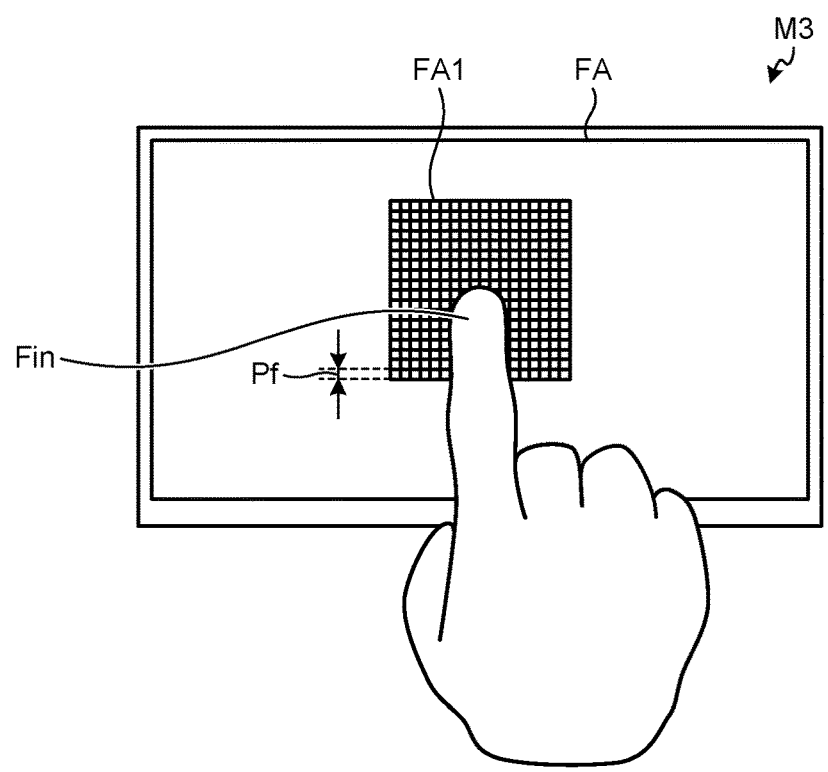
FIG. 12 is a diagram illustrating an exemplary third detection mode.

The following describes a specific example of detection modes of the personal authentication system 1 and the personal authentication device 1a. FIG. 10 is a diagram illustrating an exemplary first detection mode. FIG. 11 is a diagram illustrating an exemplary second detection mode. FIG. 12 is a diagram illustrating an exemplary third detection mode.

As illustrated in FIG. 10, in the first detection mode M1, the personal authentication system 1 and the personal authentication device 1a perform detection of the finger Fin or the like, more specifically, detection of the position of the finger on the detection surface (coordinate position of the finger on the detection surface) by scanning the entire surface of the detection region FA at a first detection pitch Pts that is larger than in the second detection mode M2 (refer to FIG. 11). In the first detection mode M1, the first electrode selection circuit 15 handles, as one first electrode block, collectively more than one of the first electrodes Tx that are adjacent or disposed at a predetermined pitch and supplies the first drive signal Vtx1 to each first electrode block. The same first drive signal Vtx1 is supplied to the first electrodes Tx included in one first electrode block. Thus, in the first detection mode M1, detection can be performed at the first detection pitch Pts that is larger than in the second detection mode M2 to be described later. In the first detection mode M1, the detection electrode selection circuit 16 may handle, as one second electrode block, collectively more than one of the second electrodes Rx that are adjacent or disposed at a predetermined pitch and supply the second drive signal Vtx2 to each second electrode block. All second electrodes Rx may be each coupled to the detector 40.

As illustrated in FIG. 11, in the second detection mode M2, the personal authentication system 1 and the personal authentication device 1a perform detection of the finger Fin or the like, more specifically, detection of asperities on the surface of the detection target body on the detection surface (for example, a fingerprint image of the detection target body in contact with the detection surface) by scanning the entire surface of the detection region FA at a second detection pitch Pf that is smaller than in the first detection mode M1 (refer to FIG. 10). In the second detection mode M2, the first electrode selection circuit 15 supplies, to each first electrode Tx, the second drive signal Vtx2 with a phase determined based on a predetermined sign. Alternatively, the first electrode selection circuit 15 may individually scan the first electrodes Tx and supply a pulsed wave as the second drive signal Vtx2 along with the scanning. Hereinafter, supply of the second drive signal Vtx2 includes both aspects. With this configuration, in the second detection mode M2, the personal authentication system 1 and the personal authentication device 1a can perform detection at the second detection pitch Pf that is smaller than in the first detection mode M1. More specifically, it may happen that although a finger is in contact with the detection surface at macroscopic viewpoint, part of the finger is in contact with the detection surface while the other part is slightly separated from the detection surface due to asperities on a surface of the finger at microscopic viewpoint. The second detection mode M2 is a mode of detecting asperities on the surface of the detection target body (in this example, asperities on the surface of the finger, in other words, fingerprint) at microscopic viewpoint. The second detection pitch only needs to be smaller than the first detection pitch, and the smallest second detection pitch is a pitch between two adjacent first electrodes or two adjacent detection electrodes intersecting them.

In the second detection mode M2, the personal authentication system 1 and the personal authentication device 1a perform detection on the entire surface of the detection region FA. Thus, the personal authentication system 1 and the personal authentication device 1a are not limited to fingerprint detection but can detect, for example, a palm print. Alternatively, the personal authentication system 1 and the personal authentication device 1a can detect the shape of a hand in contact with or in proximity to the detection region FA and identify the position of a fingertip. In this case, a fingerprint can be detected by performing signal processing and arithmetic processing only in a region in which the fingertip is in a contact state or in a proximity state.

In fingerprint detection, a fingerprint region in which detection is to be performed on the detection surface may be a partial region of the detection surface. For example, as illustrated in FIG. 12, in the third detection mode M3, the personal authentication system 1 and the personal authentication device 1a perform detection at the second detection pitch Pf in a first partial region FA1 as a part of the detection region FA. In the third detection mode M3, the first electrode selection circuit 15 supplies the second drive signal Vtx2 only to first electrodes Tx included in the first partial region FA1. In the third detection mode M3 as well, the personal authentication system 1 and the personal authentication device 1a can perform detection at the second detection pitch Pf. For example, in the third detection mode M3, since detection is performed only in the first partial region FA1, time required for detection can be reduced, and processing performed by the detector 40 (refer to FIGS. 4A and 4B) can be reduced. The first partial region FA1 is a fixed region set in advance. However, the position and size of the first partial region FA1 may be changed as appropriate.

Fingerprint detection may be executed in the third detection mode M3 in place of the second detection mode M2 described above. Specifically, touch detection in the first detection mode M1 is executed in the first period, and fingerprint detection in the third detection mode M3 is executed in the second period. Thus, the fingerprint detection period FP can be shortened and time required for detection can be reduced.

Figure 13:
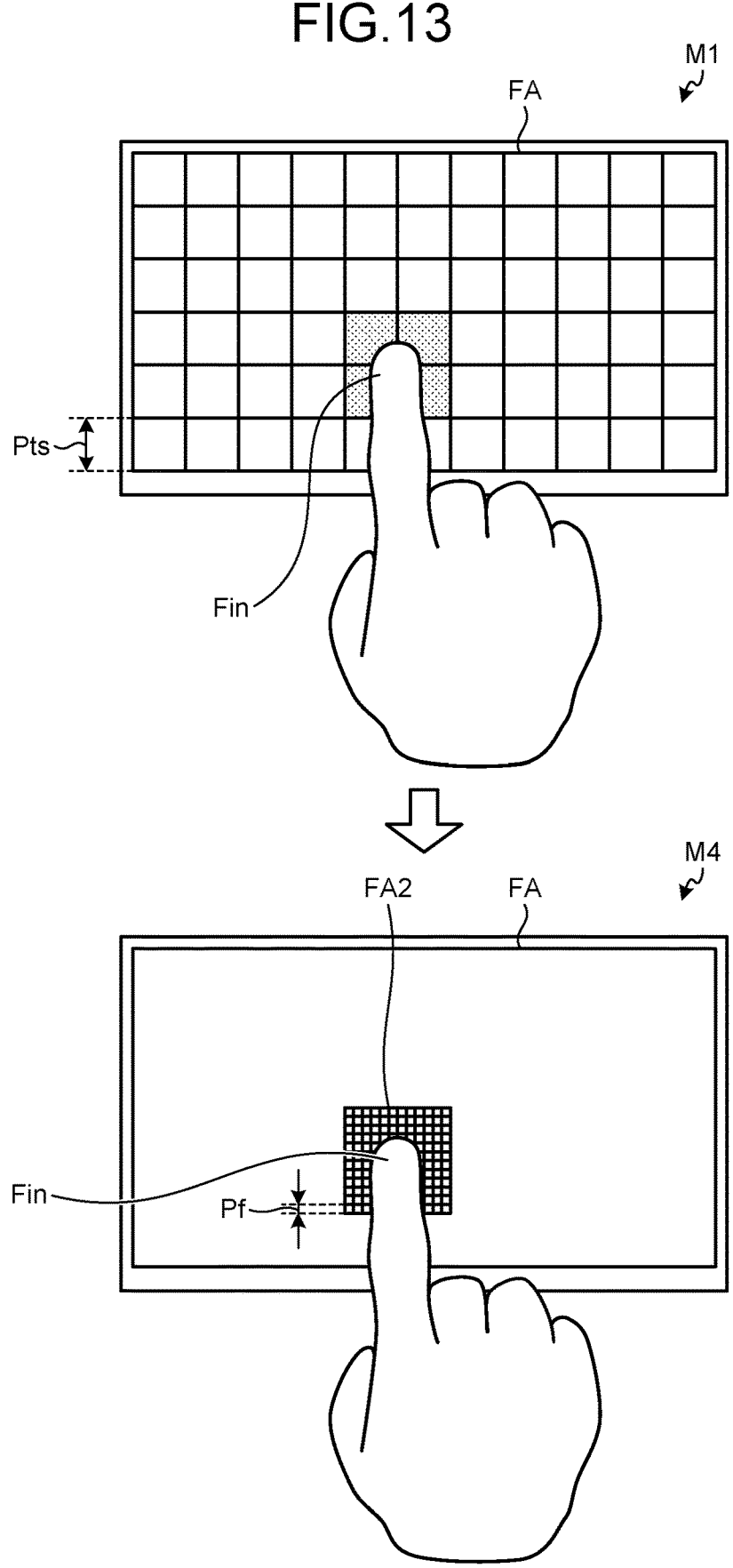
FIG. 13 is a diagram illustrating an exemplary fourth detection mode.

FIG. 13 is a diagram illustrating an exemplary fourth detection mode. For example, the personal authentication system 1 and the personal authentication device 1a execute touch detection in the first detection mode M1 in the first period, thereby detecting whether a finger is in contact with the detection surface. When having detected the finger Fin or the like, the personal authentication system 1 and the personal authentication device 1a transition from the first period to the second period and execute fingerprint detection in the fourth detection mode M4. In the fourth detection mode M4, the personal authentication system 1 and the personal authentication device 1a perform detection at the second detection pitch Pf only in a second partial region FA2 that is a predetermined region including a position at which the finger Fin or the like is detected. The position and size of the second partial region FA2 can be changed based on information of the finger Fin or the like detected in the touch detection period TP. In this manner, fingerprint detection in the fourth detection mode M4 may be performed based on a result of detection in the first detection mode M1. Thus, the area of the second partial region FA2 can be reduced, and thus time required for fingerprint detection can be significantly reduced as compared to a case in which fingerprint detection is performed across the entire surface of the detection region.

The following describes a personal authentication method according to the present disclosure. A personal authentication method performed by the personal authentication system 1 and the personal authentication device 1a is not limited to any personal authentication method described below.

FIG. 14 is a diagram illustrating an exemplary detection region in a personal authentication method according to the first embodiment. In the personal authentication method according to the present embodiment, as illustrated in FIG. 14, a plurality of first regions KY in which different input keys are respectively allocated are provided in the detection region FA. In the example illustrated in FIG. 14, the input keys are provided in 10 first regions KY "0", "1", "2", ... , "9" in which 10 numbers of "0" to "9" are respectively allocated. The input keys are not limited to numbers but may include, for example, alphabets in uppercase and lowercase and symbols such as "#" and "*".

In the personal authentication method according to the present embodiment, the personal authentication system 1 and the personal authentication device 1a perform touch detection in the second detection mode M2 described above and identify a key input by a user. Specifically, when the coordinates of a touch in the detection region FA by the user are, for example, coordinates in the first region KY "5", the personal authentication system 1 and the personal authentication device 1a identify inputting of the input key "5".

In the personal authentication method according to the present embodiment, when the coordinates of a touch in the detection region FA by the user correspond to any of the first region KY "0", "1", "2", ... , "9", a certain region having the coordinates as center coordinates C is defined as a second region FG, and the second region FG is set as a region in which a fingerprint image is to be acquired.

Figure 15:
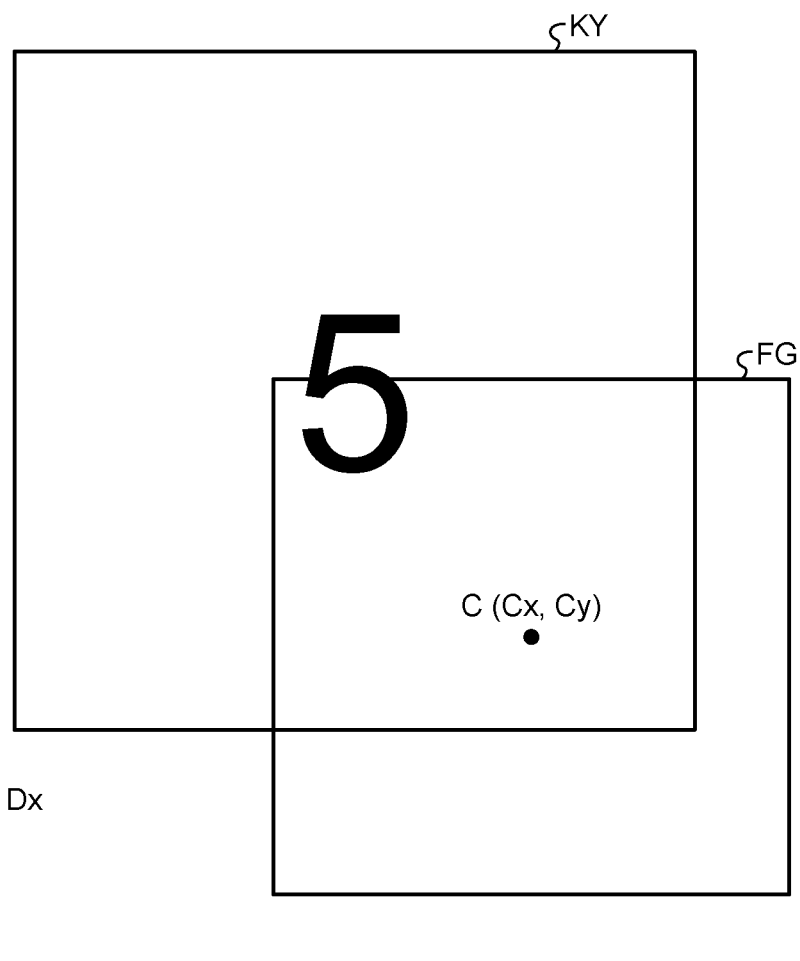
FIG. 15 is a diagram illustrating the positional relation between a first region and a second region.

FIG. 15 is a diagram illustrating the positional relation between a first region and the second region. In the example illustrated in FIG. 15, the coordinates at which inputting of the input key "5" in password inputting for personal authentication has been identified, are defined to be the center coordinates C (Cx, Cy) of the second region FG. Specifically, a user touches the detection surface to touch the input key "5" but touches a position slightly different from the central position of the input key "5", and as a result of arithmetic processing of the touch by the detector and the processor, the central position touched by the user is recognized as the center coordinates C (Cx, Cy). Then, the second region FG for fingerprint detection is determined based on the relation with the center coordinates C.

In the personal authentication method according to the present embodiment, an image of a region smaller than the second region FG illustrated in FIG. 15 is acquired each time a key in a password is input. Thus, a detection region to be detected during a time in which a touch on each input key is maintained in password inputting and an image acquired as a result can be made as small as possible. Thus, the accuracy of an image acquired for each key inputting of the password can be increased.

Then, the images acquired in the key inputtings of the password are synthesized to generate a personal authentication fingerprint image. Thus, a fingerprint image with high accuracy can be acquired.

Figure 16:
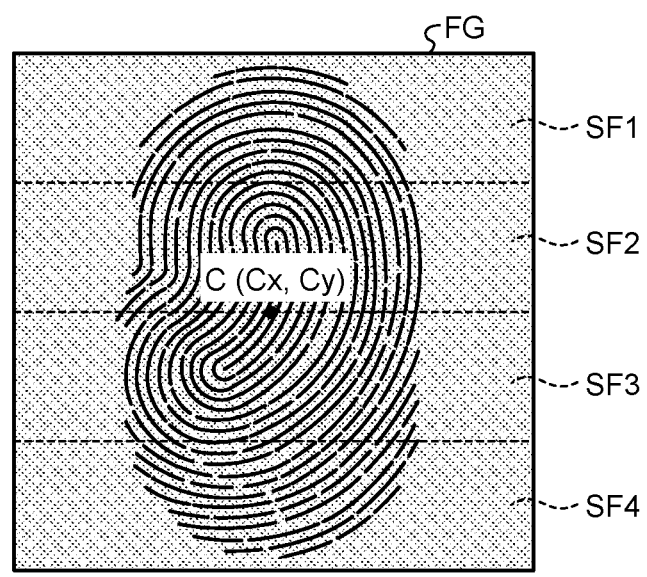
FIG. 16 is a diagram illustrating a fingerprint image after image synthesis in the first embodiment.

In the personal authentication method according to the present embodiment, the direction of scanning in touch detection and fingerprint detection is a direction along the second direction Dy. FIG. 16 is a diagram illustrating a fingerprint image after image synthesis in the first embodiment. The present embodiment describes an example in which four images segmented in a fingerprint scanning direction are synthesized to generate a fingerprint image as illustrated in FIG. 16. In the example illustrated in FIG. 16, segmented regions SF1, SF2, SF3, and SF4 for acquiring segmented images are allocated in the second region FG for acquiring a fingerprint image such that the four regions are relatively arranged along the fingerprint scanning direction.

The number of segmentations of the second region FG, in other words, the number of segmented regions SF is not limited to four. The number of segmentations of the second region FG depends on the number of password digits. For example, the number N of password digits needs to be equal to or larger than four when the four segmented regions SF1, SF2, SF3, and SF4 are allocated in the second region FG as illustrated in FIG. 16. In other words, the number of segmentations of the second region FG needs to be equal to or smaller than the number of password digits.

As illustrated in FIGS. 4A and 4B, the processor 50 includes a touch determinator 51, a detection start coordinate setter 52, a segmented image receiver 53, a first storage 54, a fingerprint image generator 55, a second storage 56, a third storage 57, a fingerprint authenticator 58, a fingerprint authentication result storage 59, a password storage 511, a password authenticator 512, a password authentication result storage 513, a personal authenticator 514, and a personal authentication result storage 515. Each of the first storage 54, the second storage 56, the third storage 57, the fingerprint authentication result storage 59, the password storage 511, the password authentication result storage 513, and the personal authentication result storage 515 may be, for example, a random-access memory (RAM), a read-only memory (ROM), or a register circuit. Alternatively, the first storage 54, the second storage 56, the third storage 57, the fingerprint authentication result storage 59, the password storage 511, the password authentication result storage 513, and the personal authentication result storage 515 may be, for example, a single RAM, ROM, or register circuit.

The touch determinator 51 determines whether the touch state is valid in the personal authentication method according to the present disclosure based on the touch detection coordinates output from the detector 40 in the first period described above.

The "touch state that is valid in the personal authentication method according to the present disclosure" means that the coordinates of a touch in the detection region FA by a user, in other words, the touch detection coordinates output from the detector 40 are coordinates included in a first region KY illustrated in FIG. 14 as described above. Specifically, when it is determined that a position at coordinates in a first region KY illustrated in FIG. 14 is in the touch state, the touch determinator 51 outputs, to the detection controller 11, the first control signal for transition to the second period. Hereinafter, being in "the touch state that is valid in the personal authentication method according to the present disclosure" described above is expressed as being "key-input". Specifically, for example, when the touch detection coordinates output from the detector 40 is coordinates in the first region KY "5" as illustrated in FIG. 15, it is expressed that "5" is key-input. In other words, when a key inputting has been detected, the touch determinator 51 outputs, to the detection controller 11, the first control signal for transition to the second period.

The touch determinator 51 sequentially stores the key-input key ("5" in the example illustrated in FIG. 15) in the password storage 511.

When the number n of accumulated keys stored in the password storage 511 reaches a predetermined number N (the number N of password digits set in advance), the touch determinator 51 outputs a password authentication start command to the password authenticator 512 at a later stage.

When key inputting is detected by the touch determinator 51, the detection start coordinate setter 52 sets fingerprint detection start coordinates (hereinafter simply referred to as "detection start coordinates") based on the key-input touch detection coordinates.

Figure 17A:
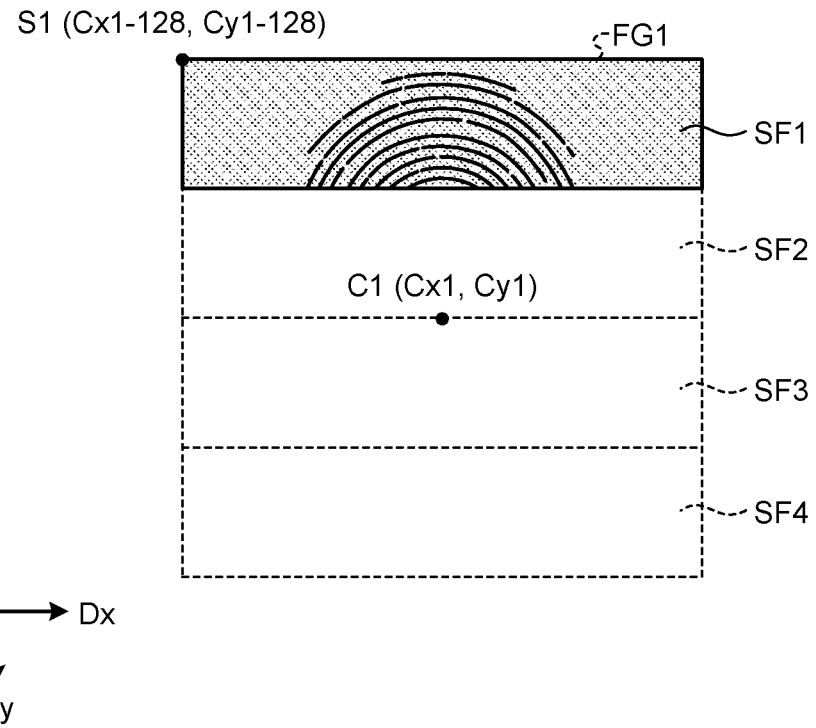
FIG. 17A is a first diagram for description of an acquisition region of a segmented image in the personal authentication method according to the first embodiment.
Figure 17B:
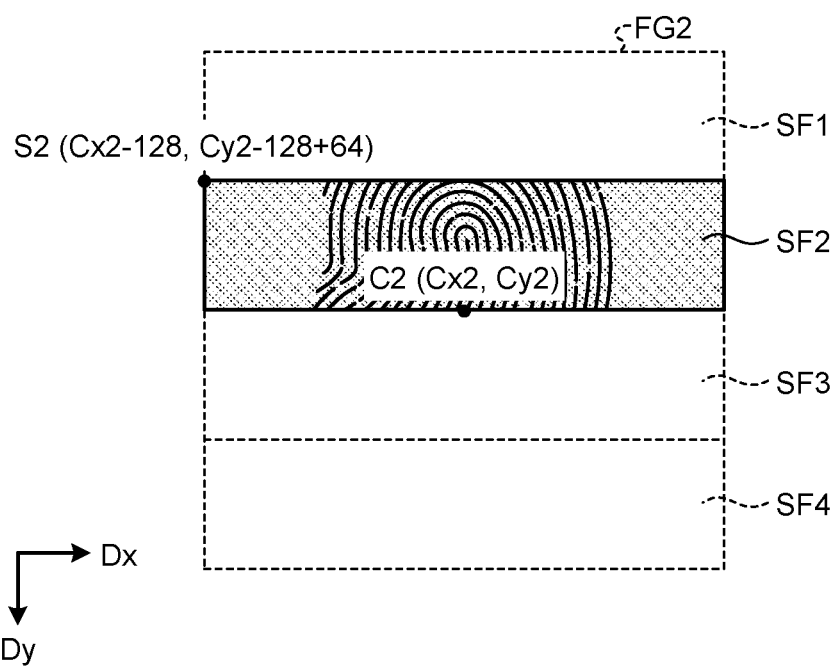
FIG. 17B is a second diagram for description of an acquisition region of a segmented image in the personal authentication method according to the first embodiment.

FIG. 17A is a first diagram for description of an acquisition region of a segmented image in the personal authentication method according to the first embodiment. FIG. 17B is a second diagram for description of an acquisition region of a segmented image in the personal authentication method according to the first embodiment.

Figure 17C:
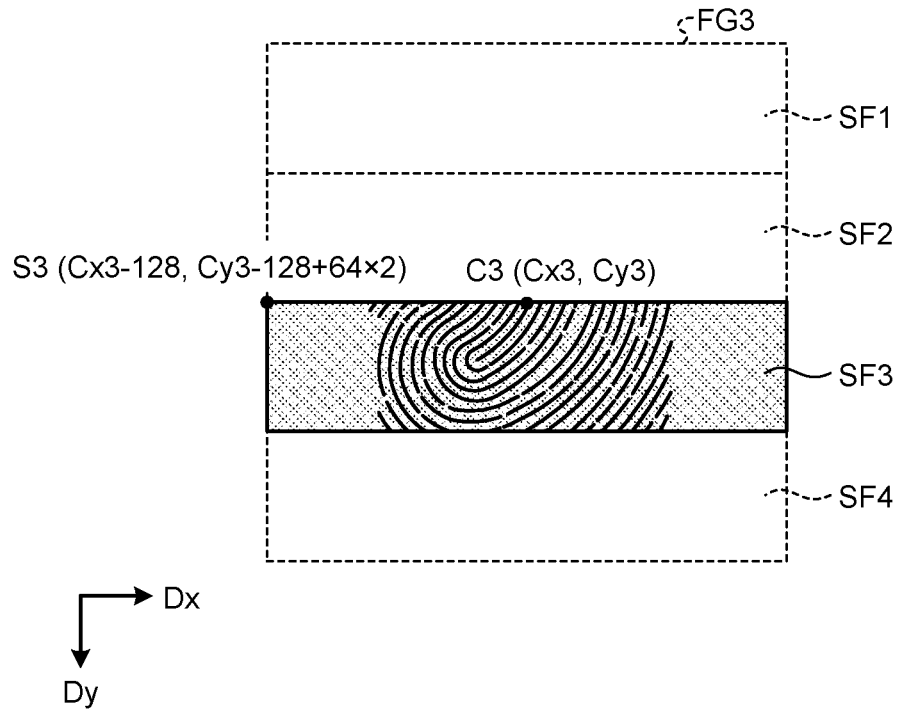
FIG. 17C is a third diagram for description of an acquisition region of a segmented image in the personal authentication method according to the first embodiment.
Figure 17D:
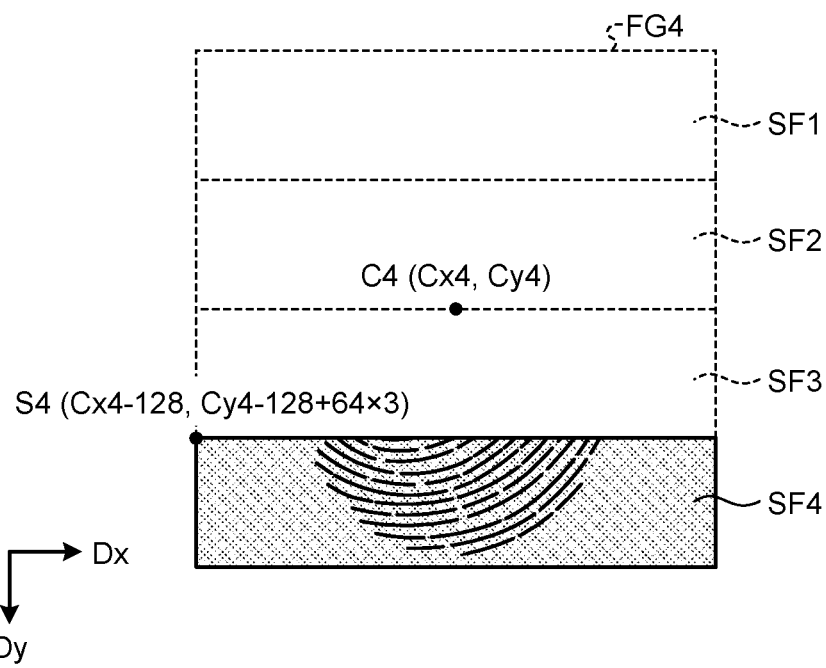
FIG. 17D is a fourth diagram for description of an acquisition region of a segmented image in the personal authentication method according to the first embodiment.

FIG. 17C is a third diagram for description of an acquisition region of a segmented image in the personal authentication method according to the first embodiment. FIG. 17D is a fourth diagram for description of an acquisition region of a segmented image in the personal authentication method according to the first embodiment.

FIG. 17A illustrates an example in which the segmented region SF1 for acquiring a segmented image is allocated in a second region FG1 in key inputting of the first password digit. FIG. 17B illustrates an example in which the segmented region SF2 for acquiring a segmented image is allocated in a second region FG2 in key inputting of the second password digit. FIG. 17C illustrates an example in which the segmented region SF3 for acquiring a segmented image is allocated in a second region FG3 in key inputting of the third password digit. FIG. 17D illustrates an example in which the segmented region SF4 for acquiring a segmented image is allocated in a second region FG4 in key inputting of the fourth password digit. In the examples illustrated in FIGS. 17A, 17B, 17C, and 17D, the segmented regions SF1, SF2, SF3, and SF4 are allocated in the second regions FG1, FG2, FG3, and FG4 for acquisition of segmented images such that the segmented regions are relatively arranged along the fingerprint scanning direction.

The following describes an example in which a fingerprint detection region, in other words, a segmented-image acquisition region in the present embodiment can be arbitrarily designated in the detection device 2 and the personal authentication device 1a. In FIGS. 17A, 17B, 17C, and 17D, the size of the second region FG is a 256×256 size with 256 in the first direction Dx and 256 in the second direction Dy.

In key inputting of the first password digit in personal authentication data acquisition processing (refer to FIG. 18) to be described later, the detection start coordinate setter 52 first sets detection start coordinates S1 (Cx1—128, Cy1—128) with respect to center coordinates C1 (Cx1, Cy1) of the second region FG1 as illustrated in FIG. 17A.

In this case, the fingerprint detection region setter 46 of the detector 40 allocates, as the fingerprint detection region in which a segmented image is to be acquired, the segmented region SF1 having a 256×64 size with a starting point at the detection start coordinates S1 (Cx1—128, Cy1—128) illustrated in FIG. 17A.

In key inputting of the second password digit in the personal authentication data acquisition processing (refer to FIG. 18) to be described later, the detection start coordinate setter 52 sets detection start coordinates S2 (Cx2—128, Cy2—128+64) with respect to center coordinates C2 (Cx2, Cy2) of the second region FG2 as illustrated in FIG. 17B. In this case, since the second password digit is input, the center coordinates of the finger on the detection surface are different from those in the case of the first password digit. Thus, in this case, the center coordinates of the second password digit are indicated as the center coordinates C2 (Cx2, Cy2).

In this case, the fingerprint detection region setter 46 of the detector 40 allocates, as the fingerprint detection region in which a segmented image is to be acquired, the segmented region SF2 having a 256×64 size with a starting point at the detection start coordinates S2 (Cx2—128, Cy2—128+64) illustrated in FIG. 17B. In other words, the second top detection region (segmented region SF2) obtained when a 256×256 detection region defined based on the center coordinates of a finger is segmented into four in the second direction Dy is allocated.

In key inputting of the third password digit in the personal authentication data acquisition processing (refer to FIG. 18) to be described later, the detection start coordinate setter 52 sets detection start coordinates S3 (Cx3—128, Cy3—128+64×2) with respect to the center coordinates C3 (Cx3, Cy3) of the second region FG3 as illustrated in FIG. 17C. In this case, since the third password digit is input, the center coordinates of the finger on the detection surface are different from those in the cases of the first and second password digits. Thus, in this case, the center coordinates of the third password digit are indicated as the center coordinates C3 (Cx3, Cy3).

In this case, the fingerprint detection region setter 46 of the detector 40 allocates, as the fingerprint detection region in which a segmented image is to be acquired, the segmented region SF3 having a 256×64 size with a starting point at the detection start coordinates S3 (Cx3—128, Cy3—128+64×2) illustrated in FIG. 17C. In other words, the third top detection region (segmented region SF3) obtained when a 256×256 detection region defined based on the center coordinates of a finger is segmented into four in the second direction Dy is allocated.

In key inputting of the fourth password digit in the personal authentication data acquisition processing (refer to FIG. 18) to be described later, the detection start coordinate setter 52 sets a detection start coordinates S4 (Cx4—128, Cy4—128+64×3) with respect to the center coordinates C4 (Cx4, Cy4) of the second region FG4 as illustrated in FIG. 17D. In this case, since the fourth password digit is input, the center coordinates of the finger on the detection surface are different from those in the cases of the first, second, and third password digits. Thus, in this case, the center coordinates of the fourth password digit are indicated as the center coordinates C4 (Cx4, Cy4).

In this case, the fingerprint detection region setter 46 of the detector 40 allocates, as the fingerprint detection region in which a segmented image is to be acquired, the segmented region SF4 having a 256×64 size with a starting point at the detection start coordinates S4 (Cx4—128, Cy4—128+64×3) illustrated in FIG. 17D. In other words, the fourth top detection region (segmented region SF4) obtained when a 256×256 detection region defined based on the center coordinates of a finger is segmented into four in the second direction Dy is allocated.

Segmented images of the segmented regions SF1, SF2, SF3, and SF4 set in this manner are acquired and synthesized, whereby a personal authentication fingerprint image with high authentication accuracy can be generated.

As illustrated in FIGS. 4A and 4B, the segmented image receiver 53 receives the segmented images output from the detector 40 in the second period described above and stores the received segmented images as buffering data in the first storage 54.

The fingerprint image generator 55 reads the segmented images stored as buffering data in the first storage 54 and sequentially stores the segmented images as buffering data in the second storage 56. In this case, the fingerprint image generator 55 outputs, to the detection controller 11, the second control signal for transition to the first period.

When the number m of the segmented images stored and accumulated in the second storage 56 reaches a predetermined number M (in the example illustrated in FIG. 16, the number M of segmented images in the four segmented regions SF1, SF2, SF3, and SF4), the fingerprint image generator 55 generates a personal authentication fingerprint image by synthesizing the segmented images stored in the second storage 56, stores the generated personal authentication fingerprint image in the third storage 57, and outputs a fingerprint authentication start command to the fingerprint authenticator 58 at a later stage.

The fingerprint authenticator 58 performs, based on the fingerprint authentication start command from the fingerprint image generator 55, authentication determination processing on the personal authentication fingerprint image stored in the third storage 57 and stores a result of the fingerprint authentication determination in the fingerprint authentication result storage 59. The present disclosure is not limited by this authentication determination method. For example, the personal authentication fingerprint image stored in the third storage 57 may be collated with a collation fingerprint image acquired in advance, and it may be determined that authentication is successful when predetermined feature points of those fingerprint images match.

The password authenticator 512 generates, based on the password authentication start command from the touch determinator 51, a personal authentication password by synthesizing keys stored in the password storage 511, performs authentication determination processing on the personal authentication password, and stores a result of the password authentication determination in the password authentication result storage 513. Specifically, for example, the generated personal authentication password is collated with a collation password set in advance, and it is determined that authentication is successful when those passwords match.

The personal authenticator 514 refers to the password authentication determination result stored in the password authentication result storage 513 and the fingerprint authentication determination result stored in the fingerprint authentication result storage 59, performs personal authentication determination processing, and stores a result of the personal authentication processing in the personal authentication result storage 515. Specifically, the personal authenticator 514 determines that personal authentication is successful when the password authentication determination result indicates that authentication is successful and the fingerprint authentication determination result indicates that authentication is successful.

Figure 18:
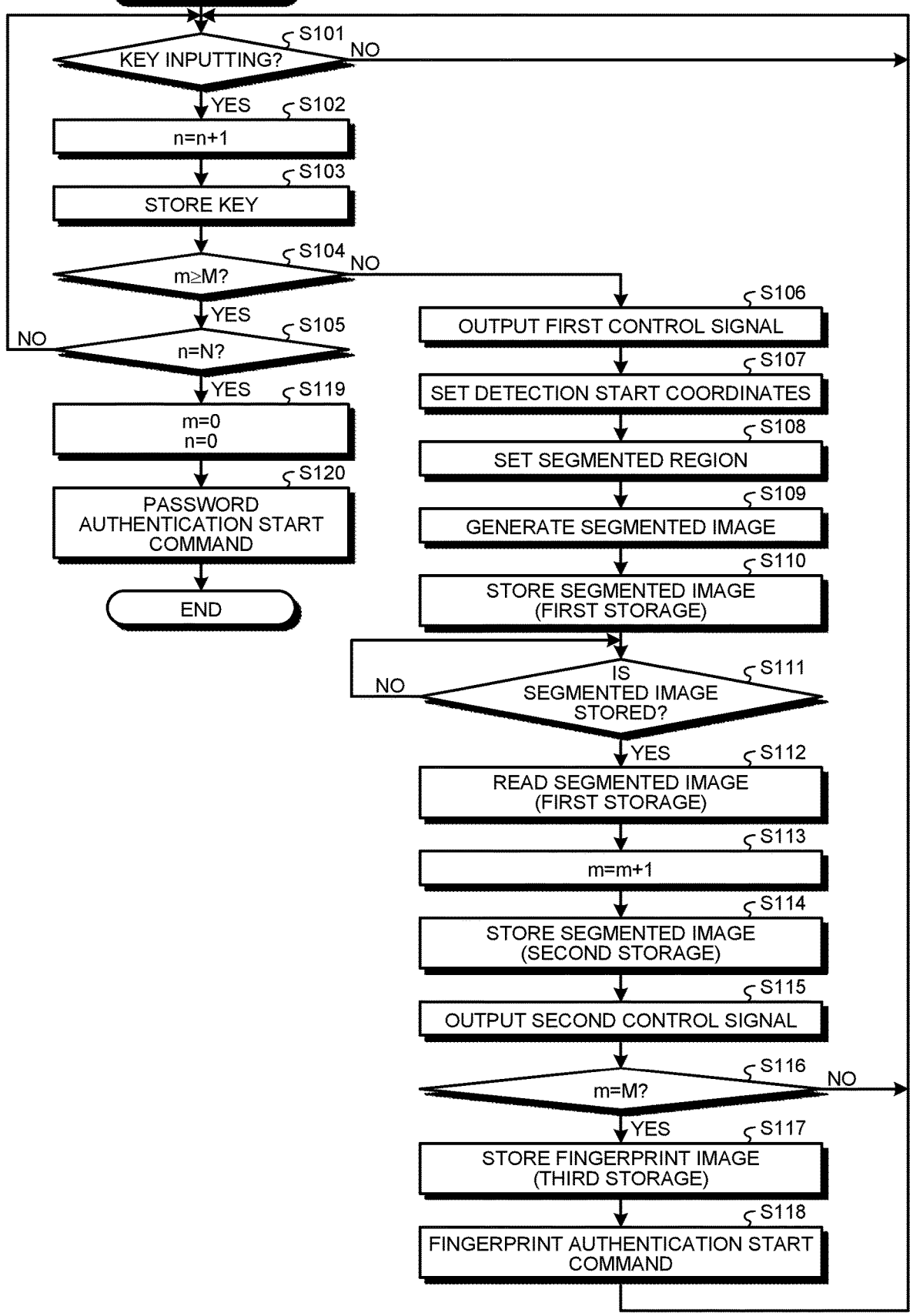
FIG. 18 is a flowchart illustrating exemplary personal authentication data acquisition processing in the personal authentication system and the personal authentication device according to the first embodiment.
Figure 19:
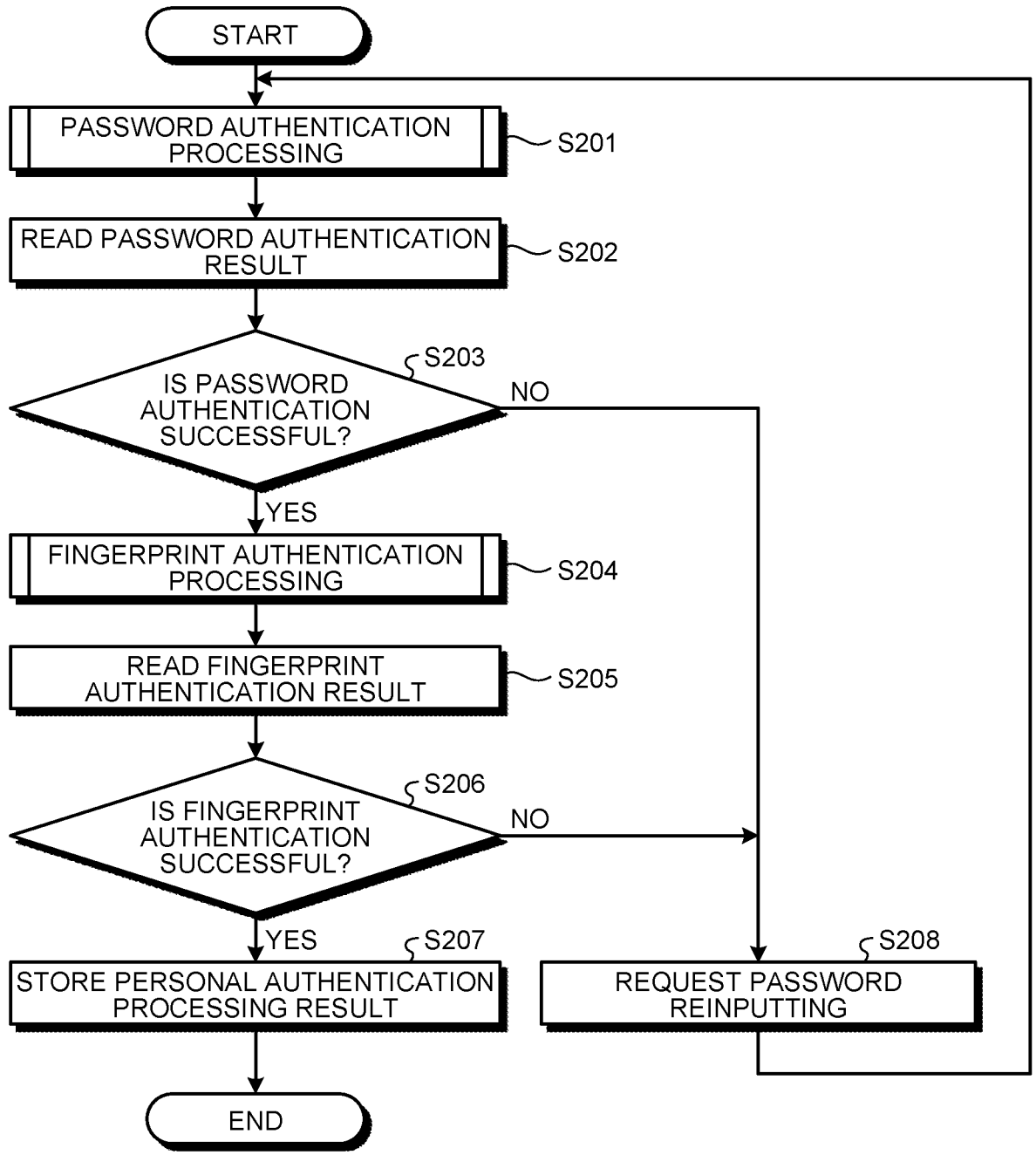
FIG. 19 is a flowchart illustrating exemplary personal authentication processing in the personal authentication system and the personal authentication device according to the first embodiment.
Figure 20:
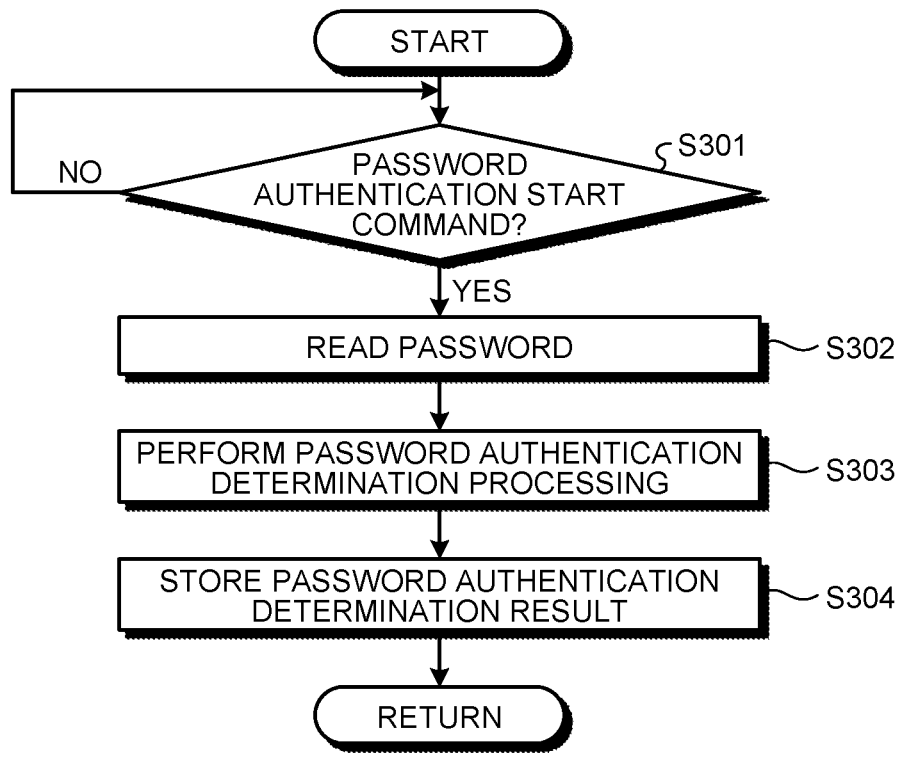
FIG. 20 is a sub flowchart illustrating exemplary password authentication processing in the personal authentication system and the personal authentication device according to the first embodiment.
Figure 21:
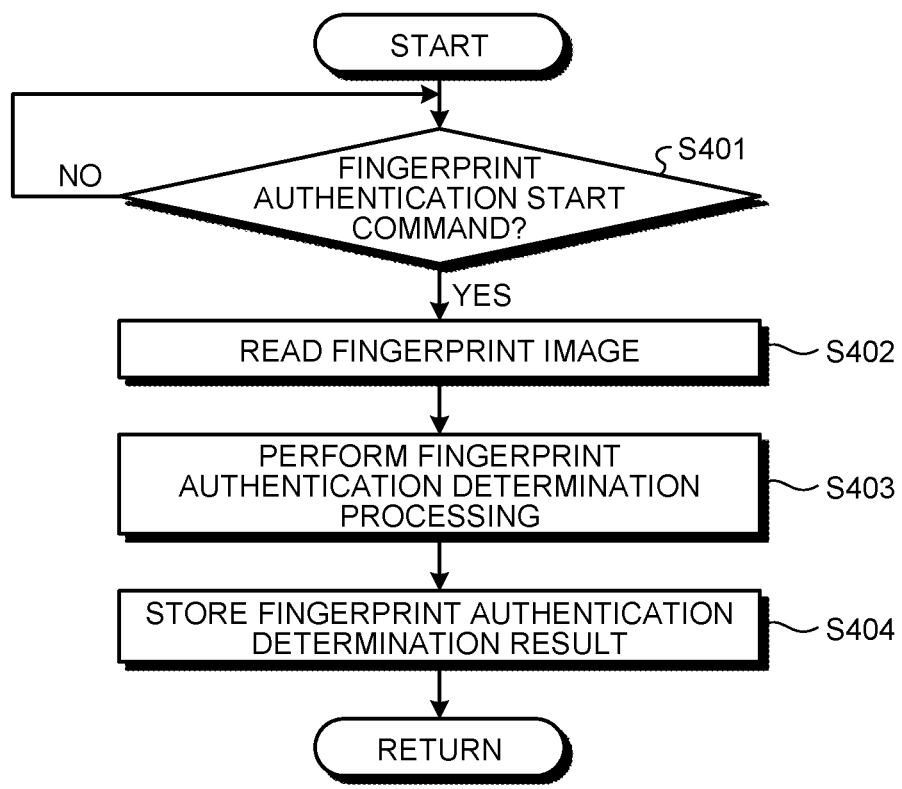
FIG. 21 is a sub flowchart illustrating exemplary fingerprint authentication processing in the personal authentication system and the personal authentication device according to the first embodiment.
Figure 22:
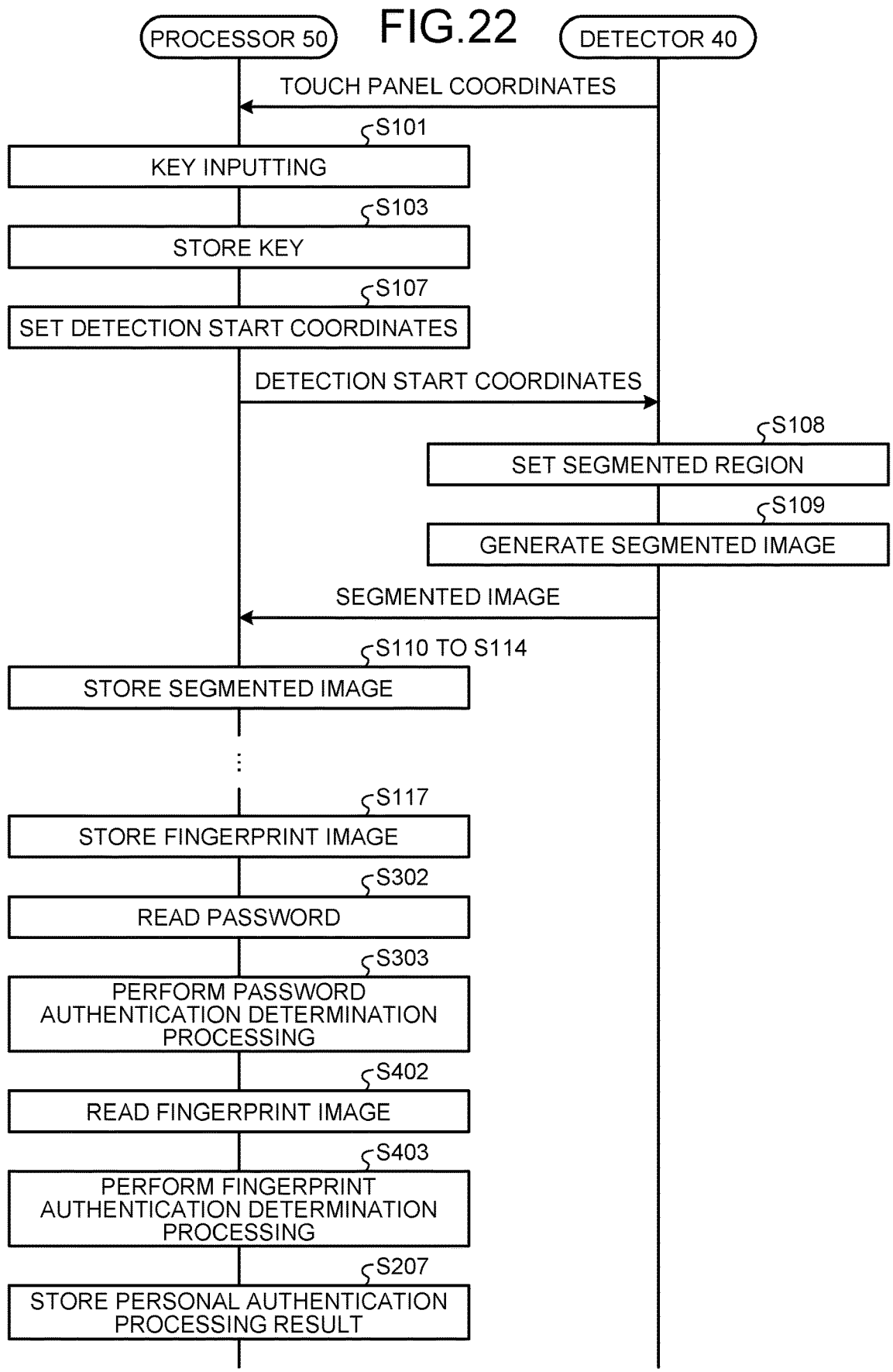
FIG. 22 is a sequence diagram illustrating a specific example of processing in the personal authentication system and the personal authentication device according to the first embodiment.

The following describes a specific example of the personal authentication method achieved by the detector 40 and the processor 50 in the personal authentication system 1 and the personal authentication device 1a according to the first embodiment with reference to FIGS. 18, 19, 20, and 21. FIG. 18 is a flowchart illustrating exemplary personal authentication data acquisition processing in the personal authentication system and the personal authentication device according to the first embodiment. FIG. 19 is a flowchart illustrating exemplary personal authentication processing in the personal authentication system and the personal authentication device according to the first embodiment. FIG. 20 is a sub flowchart illustrating exemplary password authentication processing in the personal authentication system and the personal authentication device according to the first embodiment. FIG. 21 is a sub flowchart illustrating exemplary fingerprint authentication processing in the personal authentication system and the personal authentication device according to the first embodiment. FIG. 22 is a sequence diagram illustrating a specific example of processing in the personal authentication system and the personal authentication device according to the first embodiment.

The following first describes the personal authentication data acquisition processing in the personal authentication system 1 and the personal authentication device 1a according to the first embodiment with reference to FIGS. 18 and 22.

As a precondition of the personal authentication data acquisition processing illustrated in FIG. 18, the personal authentication system 1 and the personal authentication device 1a continuously executes touch detection to detect a touch on the detection region FA in the first period. In addition, the number m of accumulated segmented images and the number n of accumulated keys are reset (m=0 and n=0).

The touch determinator 51 of the processor 50 determines whether key inputting is performed based on the touch detection coordinates acquired in the first period (step S101). When key inputting is not performed (No at step S101), the touch determinator 51 repeatedly executes the processing at step S101 until key inputting is performed (Yes at step S101).

When it is determined that key inputting is performed (Yes at step S101), the touch determinator 51 counts up (increments) the number n of accumulated keys (step S102) and stores the key-input key ("5" in the example illustrated in FIG. 15) in the password storage 511 (step S103).

The touch determinator 51 determines whether the number m of accumulated segmented images stored in the second storage 56 is equal to or larger than a predetermined number M (the number M of segmented regions SF in the second region FG) (step S104). For example, assuming that, at this stage, key inputting of the first password digit is just performed and no segmented image is accumulated. In this case, the number of accumulated segmented images is zero and smaller than the predetermined number (in the present example, four). In this case, the process advances to the next step S106.

When the number m of accumulated segmented images stored in the second storage 56 becomes equal to or larger than the predetermined number M (Yes at step S104), the touch determinator 51 subsequently determines whether the number n of accumulated keys stored in the password storage 511 has reached a predetermined number N (the number N of password digits) (step S105). Specifically, four segmented images are sequentially acquired along with four password inputs in the present embodiment, and thus, after inputting of four password input key, the number m of accumulated segmented images reaches four, which is equal to the predetermined number M=4, and thus, the number n=4 of accumulated keys for the password is equal to the predetermined number N=4 (Yes at step S104 and Yes at step S105).

When the number n of accumulated keys stored in the password storage 511 has not reached the predetermined number N (the number N of password digits) (No at step S105), the process returns to the processing at step S101, and the processing up to step S105 is repeatedly performed until the number n of accumulated keys stored in the password storage 511 reaches the predetermined number N (Yes at step S105). As described above, it is assumed in the present embodiment that the number of accumulated segmented images and the number n of accumulated password input keys are equal to each other and both accumulated numbers are equal to each other (m=n and M=N). In this case, S105 may be omitted.

When the number m of accumulated segmented images stored in the second storage 56 is smaller than the predetermined number M (No at step S104), the touch determinator 51 output, to the detection controller 11, the first control signal for transition from the first period in which touch detection is performed to the second period in which fingerprint detection is performed (step S106).

The detection controller 11 controls, based on the first control signal output from the touch determinator 51, the first electrode selection circuit 15 and the detection electrode selection circuit 16 to perform fingerprint detection in a segmented region set by the fingerprint detection region setter 46. Thus, transition to the second period in which fingerprint detection is performed is made. As described above, key inputting of the first password digit is completed at this stage, and then control to acquire the segmented image illustrated in FIG. 17A is performed.

The detection start coordinate setter 52 sets, based on the key-input touch detection coordinates, the detection start coordinates described above with reference to FIG. 17A (step S107) and outputs the detection start coordinates to the fingerprint detection region setter 46 of the detector 40.

The fingerprint detection region setter 46 allocates, as a region in which a segmented image is to be acquired, the segmented region described above with reference to FIG. 17A with a starting point at the detection start coordinates output from the detection start coordinate setter 52 (step S108).

The segmented image generator 47 of the detector 40 generates, based on a result of the decoding processing by the signal processor 44, a segmented image of the segmented region allocated by the fingerprint detection region setter 46 (step S109) and outputs the segmented image to the processor 50. At this stage after the above-described steps, the segmented image illustrated in FIG. 17A is generated along with key inputting of the first password digit and is output to the segmented image receiver 53 of the processor 50.

The segmented image receiver 53 of the processor 50 receives the segmented image output from the segmented image generator 47 of the detector 40 and stores the segmented image as buffering data in the first storage 54 (step S110). Thus, in this processing process, the segmented image illustrated in FIG. 17A is stored in the first storage 54.

The fingerprint image generator 55 determines whether a segmented image is stored in the first storage 54 (step S111). When no segmented image is stored in the first storage 54 (No at step S111), the fingerprint image generator 55 repeatedly executes the processing at step S111.

When it is determined that a segmented image is stored in the first storage 54 (Yes at step S111), the fingerprint image generator 55 reads a segmented image stored as buffering data (step S112), counts up (increments) the number m of accumulated segmented images (step S113), and stores the segmented image read from the first storage 54 as buffering data in the second storage 56 (step S114). Thus, in this process, the segmented image illustrated in FIG. 17A is stored in the second storage 56.

Then, the fingerprint image generator 55 outputs, to the detection controller 11, the second control signal for transition from the second period in which fingerprint detection is performed to the first period in which touch detection is performed (step S115).

The detection controller 11 controls, based on the second control signal output from the fingerprint image generator 55, the first electrode selection circuit 15 and the detection electrode selection circuit 16 to perform touch detection in the entire area of the detection region FA. Thus, transition to the first period in which touch detection is performed is made.

Subsequently, the fingerprint image generator 55 determines whether the number m of accumulated segmented images stored in the second storage 56 has reached the predetermined number M (the number of segmentations of the second region FG) (step S116).

When the number m of accumulated segmented images stored in the second storage 56 has not reached the predetermined number M (No at step S116), the process returns to the processing at step S101 and the processing up to step S116 is repeatedly performed until the accumulated number m of segmented images stored in the second storage 56 reaches the predetermined number M (Yes at step S116). That is, through the processing from S101 to S114, inputting of an input key at the first password digit is checked and acquisition of a segmented image of the fingerprint along with inputting of the input key is completed. In addition, through the processing from steps S115 and S116, transition from a fingerprint authentication mode to a normal touch detection mode is made and it is checked that the number of accumulated segmented images has not reached the predetermined number yet. As a result, the process returns to S101, and through the processing from S101 to S114 again, an input key at the second password digit is acquired and the segmented image illustrated in FIG. 17B is acquired. Thereafter, through the same processing, each password input key is acquired, and processing for acquiring the fingerprint segmented images illustrated in FIGS. 17C and 17D is sequentially performed.

When acquisition of the segmented image illustrated in FIG. 17D is completed, the number m of accumulated segmented images stored in the second storage 56 reaches the predetermined number M (Yes at step S116). Then, the fingerprint image generator 55 stores, in the third storage 57, the segmented images stored in the second storage 56 as one personal authentication fingerprint image (step S117), and outputs a fingerprint authentication start command to the fingerprint authenticator 58 at a later stage (step S118).

Thereafter, the process returns to step S101, and when the accumulated number n of keys stored in the password storage 511 has reached the predetermined number N (Yes at step S105), the touch determinator 51 resets the accumulated number m of segmented images and the accumulated number n of keys (step S119) and outputs a password authentication start command to the password authenticator 512 at a later stage (step S120).

The following describes the personal authentication processing in the personal authentication system 1 and the personal authentication device 1a according to the first embodiment with reference to FIGS. 19, 20, 21, and 22.

After the personal authentication processing is started, the password authenticator 512 executes the password authentication processing (step S201 in FIG. 19) illustrated in FIG. 20.

The password authenticator 512 determines whether the password authentication start command is output from the touch determinator 51 (step S301). When the password authentication start command is not output (No at step S301), the password authenticator 512 repeatedly executes the processing at step S301 until the password authentication start command is output from the touch determinator 51 (Yes at step S301).

When the password authentication start command is output from the touch determinator 51 (Yes at step S301), the password authenticator 512 reads keys stored in the password storage 511 (step S302), generates a personal authentication password, executes the authentication determination processing on the password (step S303), and stores a password authentication determination result in the password authentication result storage 513 (step S304).

Referring back to FIG. 19, the personal authenticator 514 reads the password authentication determination result stored in the password authentication result storage 513 (step S202) and determines whether the password authentication is successful (step S203).

When the password authentication is successful (Yes at step S203), the fingerprint authenticator 58 executes the fingerprint authentication processing (step S204 in FIG. 19) illustrated in FIG. 21.

The fingerprint authenticator 58 determines whether the fingerprint authentication start command is output from the fingerprint image generator 55 (step S401). When the fingerprint authentication start command is not output (No at step S401), the fingerprint authenticator 58 repeatedly executes the processing at step S401 until the fingerprint authentication start command is output from the fingerprint image generator 55 (Yes at step S401).

When the fingerprint authentication start command is output from the fingerprint image generator 55 (Yes at step S401), the fingerprint authenticator 58 reads a personal authentication fingerprint image stored in the third storage 57 (step S402), executes the authentication determination processing on the fingerprint image (step S403), and stores a result of the fingerprint authentication determination in the fingerprint authentication result storage 59 (step S404).

Referring back to FIG. 19, the personal authenticator 514 reads the fingerprint authentication determination result stored in the fingerprint authentication result storage 59 (step S205) and determines whether the fingerprint authentication is successful (step S206).

When the fingerprint authentication is successful (Yes at step S206), the personal authenticator 514 stores, in the personal authentication result storage 515, a personal authentication processing result indicating that personal authentication is successful (step S207).

When the password authentication is unsuccessful (No at step S203) or the fingerprint authentication is unsuccessful (No at step S206), the personal authenticator 514 outputs a password reinput request to a higher-level processing device (not illustrated) (step S208).

Through the personal authentication data acquisition processing and the personal authentication processing described above, a highly accurate fingerprint image can be acquired in password inputting, and thus the authentication accuracy can be improved. Moreover, since the fingerprint image can be acquired in password inputting, security can be reinforced without degradation of convenience.

According to the present embodiment, it is possible to obtain the personal authentication system 1, the personal authentication device 1a, the display device 100, and the personal authentication method that can achieve both security reinforcement and authentication accuracy improvement without degrading convenience.

Modification

The following describes a modification of the first embodiment. Although the first embodiment is described above with the example in which the fingerprint detection region can be arbitrarily designated in the detection device 2 and the personal authentication device 1a, the modification of the first embodiment will be described below with an example in which the size of the fingerprint detection region is fixed.

Figure 23A:
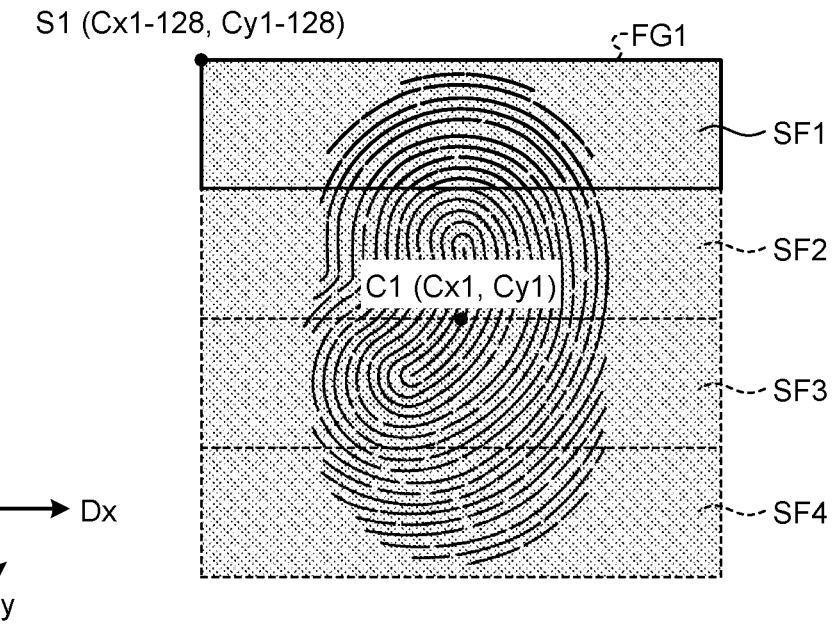
FIG. 23A is a first diagram for description of an image acquisition region in a personal authentication method according to a modification of the first embodiment.
Figure 23B:
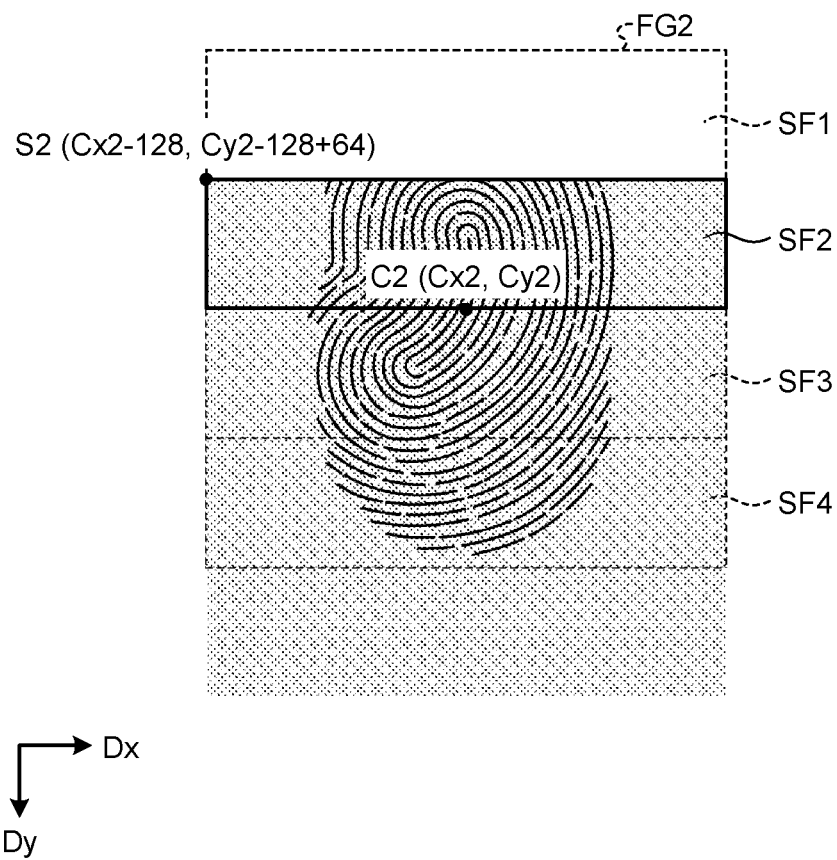
FIG. 23B is a second diagram for description of an image acquisition region in the personal authentication method according to the modification of the first embodiment.
Figure 23C:
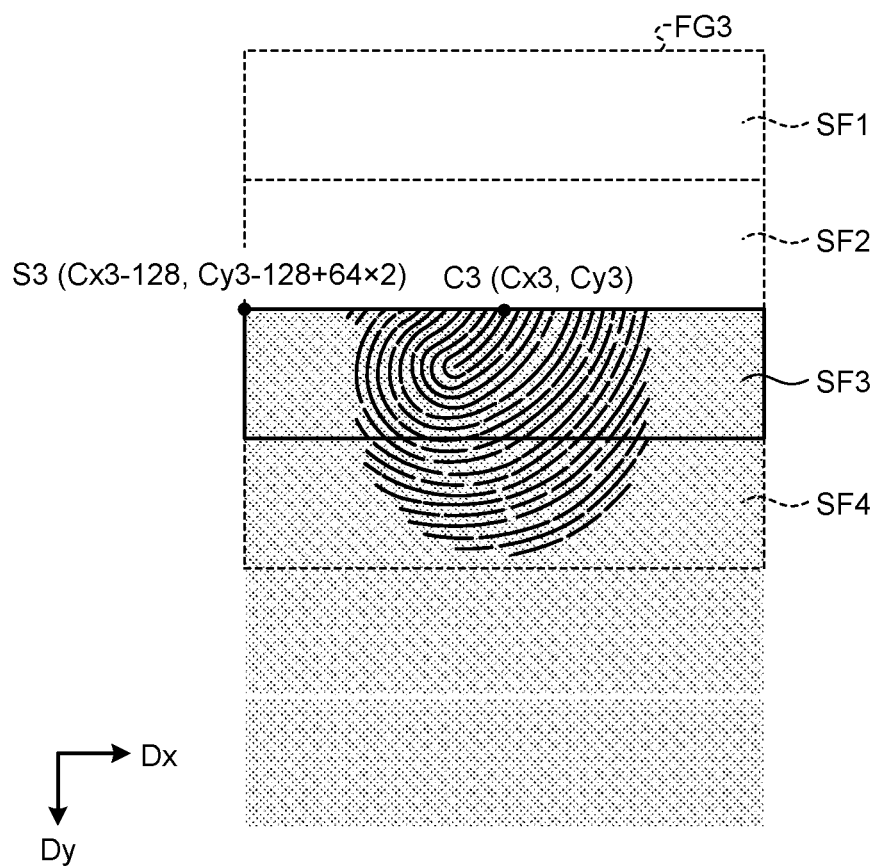
FIG. 23C is a third diagram for description of an image acquisition region in the personal authentication method according to the modification of the first embodiment.
Figure 23D:
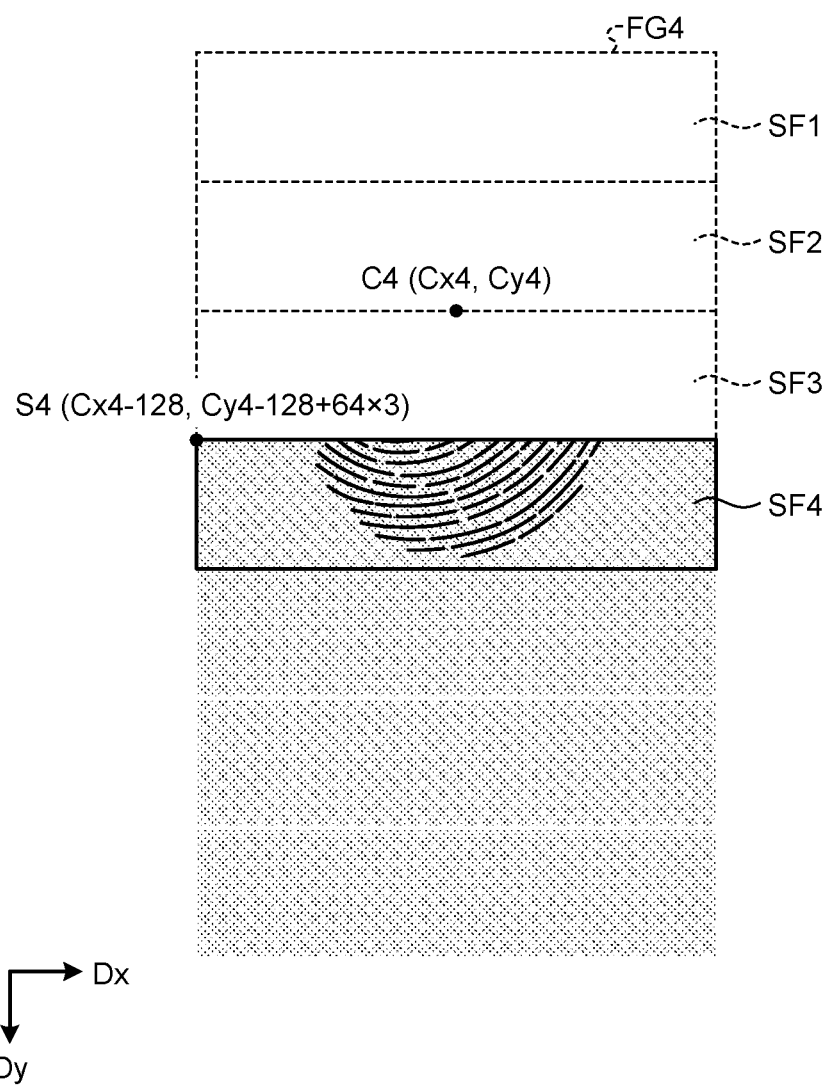
FIG. 23D is a fourth diagram for description of an image acquisition region in the personal authentication method according to the modification of the first embodiment.

FIG. 23A is a first diagram for description of an image acquisition region in a personal authentication method according to the modification of the first embodiment. FIG. 23B is a second diagram for description of an image acquisition region in the personal authentication method according to the modification of the first embodiment. FIG. 23C is a third diagram for description of an image acquisition region in the personal authentication method according to the modification of the first embodiment. FIG. 23D is a fourth diagram for description of an image acquisition region in the personal authentication method according to the modification of the first embodiment. In FIGS. 23A, 23B, 23C, and 23D, the size of the fingerprint detection region is a 256×256 size with 256 in the first direction Dx and 256 in the second direction Dy, which is the same as the size of the second region FG.

FIG. 23A illustrates an example in which the segmented region SF1 for acquiring a segmented image is allocated in a second region FG1 for key inputting of the first password digit. FIG. 23B illustrates an example in which the segmented region SF2 for acquiring a segmented image is allocated in a second region FG2 for key inputting of the second password digit. FIG. 23C illustrates an example in which the segmented region SF3 for acquiring a segmented image is allocated in a second region FG3 for key inputting of the third password digit. FIG. 23D illustrates an example in which the segmented region SF4 for acquiring a segmented image is allocated in a second region FG4 for key inputting of the fourth password digit. In the examples illustrated in FIGS. 23A, 23B, 23C, and 23D, the segmented regions SF1, SF2, SF3, and SF4 are relatively allocated in the second regions FG1, FG2, FG3, and FG4 for acquisition of segmented images such that the segmented regions are relatively arranged along the fingerprint scanning direction.

In the modification of the first embodiment, step S107 performed by the detection start coordinate setter 52, step S108 performed by the fingerprint detection region setter 46, and step S109 performed by the segmented image generator 47 in the personal authentication data acquisition processing illustrated in FIG. 18 are different. The following describes processing performed by the detection start coordinate setter 52, the fingerprint detection region setter 46, and the segmented image generator 47 and different from that in FIG. 18.

In the modification of the first embodiment, the detection start coordinate setter 52 sets the detection start coordinates S1 (Cx1—128, Cy1—128) with respect to the center coordinates C1 (Cx1, Cy1) of the second region FG1 in key inputting of the first password digit (refer to FIG. 23A).

In this case, the fingerprint detection region setter 46 of the detector 40 allocates, as the fingerprint detection region, a region having a 256×256 size with a starting point at the detection start coordinates S1 (Cx1—128, Cy1—128) illustrated in FIG. 23A and segments the region into four subframes in the scanning direction, each subframe having a 256×64 size.

Then, segmented images of the four subframes are generated by the segmented image generator 47 at a later stage. The segmented image of the subframe corresponding to the segmented region SF1 including the detection start coordinates S1 (Cx1—128, Cy1—128) is stored as buffering data in the first storage 54 by the segmented image receiver 53 of the processor 50, and the segmented images of the remaining three subframes are discarded.

The detection start coordinate setter 52 sets the detection start coordinates S2 (Cx2—128, Cy2—128+64) with respect to the center coordinates C2 (Cx2, Cy2) of the second region FG2 in key inputting of the second password digit (refer to FIG. 23B). In this case, since the second password digit is input, the center coordinates of the finger on the detection surface are different from those in the case of the first password digit. Thus, in this case, the center coordinates of the second password digit are indicated as the center coordinates C2 (Cx2, Cy2).

In this case, the fingerprint detection region setter 46 of the detector 40 allocates, as the fingerprint detection region, a region having a 256×256 size with a starting point at the detection start coordinates S2 (Cx2—128, Cy2—128+64) illustrated in FIG. 23B and segments the region into four subframes in the scanning direction, each subframe having a 256×64 size. In other words, subframes are sequentially allocated to four regions into which a 256×256 detection region with a starting point at the detection start coordinates S2 (Cx2—128, Cy2—128+64) illustrated in FIG. 23B is segmented in the second direction Dy based on the center coordinates of the finger, in order from the top detection region (segmented region SF2).

Then, segmented images of the four subframes are generated by the segmented image generator 47 at a later stage. The segmented image of the subframe corresponding to the segmented region SF2 including the detection start coordinates S2 (Cx2—128, Cy2—128+64) is stored as buffering data in the first storage 54 by the segmented image receiver 53 of the processor 50, and the segmented images of the remaining three subframes are discarded.

The detection start coordinate setter 52 sets the detection start coordinates S3 (Cx3—128, Cy3—128+64×2) with respect to the center coordinates C3 (Cx3, Cy3) of the second region FG3 in key inputting of the third password digit (refer to FIG. 23C). In this case, since the third password digit is input, the center coordinates of the finger on the detection surface are different from those in the cases of the first and second password digits. Thus, in this case, the center coordinates of the third password digit are indicated as the center coordinates C3 (Cx3, Cy3).

In this case, the fingerprint detection region setter 46 of the detector 40 allocates, as the fingerprint detection region, a region having a 256×256 size with a starting point at the detection start coordinates S3 (Cx3—128, Cy3—128+64×2) illustrated in FIG. 23C and segments the region into four subframes in the scanning direction, each subframe having a 256×64 size. In other words, subframes are sequentially allocated to four regions into which a 256×256 detection region with a starting point at the detection start coordinates S3 (Cx3—128, Cy3—128+64×2) illustrated in FIG. 23C is segmented in the second direction Dy based on the center coordinates of the finger, in order from the top detection region (segmented region SF3).

Then, segmented images of the four subframes are generated by the segmented image generator 47 at a later stage. The segmented image of the subframe corresponding to the segmented region SF3 including the detection start coordinates S3 (Cx3—128, Cy3—128+64×2) is stored as buffering data in the first storage 54 by the segmented image receiver 53 of the processor 50, and the segmented images of the remaining three subframes are discarded.

The detection start coordinate setter 52 sets the detection start coordinates S4 (Cx4—128, Cy4—128+64×3) with respect to the center coordinates C4 (Cx4, Cy4) of the second region FG4 in key inputting of the fourth password digit (refer to FIG. 23D). In this case, since the fourth password digit is input, the center coordinates of the finger on the detection surface are different from those in the cases of the first, second, and third password digits. Thus, in this case, the center coordinates of the fourth password digit are indicated as the center coordinates C4 (Cx4, Cy4).

In this case, the fingerprint detection region setter 46 of the detector 40 allocates, as the fingerprint detection region, a region having a 256×256 size with a starting point at the detection start coordinates S4 (Cx4—128, Cy4—128+64×3) illustrated in FIG. 23D and segments the region into four subframes in the scanning direction, each subframe having a 256×64 size. In other words, subframes are sequentially allocated to four regions into which a 256×256 detection region with a starting point at the detection start coordinates S4 (Cx4—128, Cy4—128+64×3) illustrated in FIG. 23D is segmented in the second direction Dy based on the center coordinates of the finger, in order from the top detection region (segmented region SF4).

Then, segmented images of the four subframes are generated by the segmented image generator 47 at a later stage. The segmented image of the subframe corresponding to the segmented region SF4 including the detection start coordinates S4 (Cx4—128, Cy4—128+64×3) is stored as buffering data in the first storage 54 by the segmented image receiver 53 of the processor 50, and the segmented images of the remaining three subframes are discarded.

Segmented images corresponding to the segmented regions SF1, SF2, SF3, and SF4 set in this manner are acquired and synthesized, whereby a personal authentication fingerprint image with high authentication accuracy can be generated. Although segmentation into four subframes is performed in each fingerprint detection in the above description, only the top subframe is finally needed in each fingerprint detection. Thus, another possible fingerprint detection process can be employed in which only a 256×64 region from the detection start coordinates of the top subframe is recognized as a subframe and the other regions are not recognized as subframes in any fingerprint detection.

Second Embodiment

Figure 24:
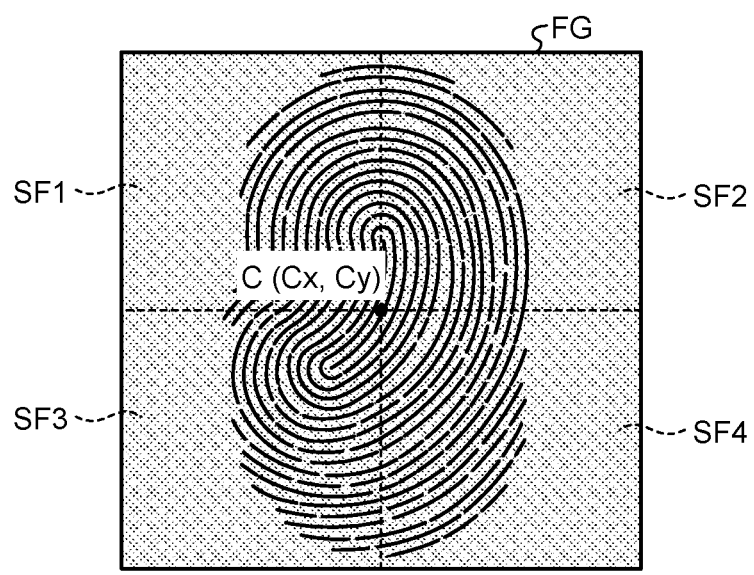
FIG. 24 is a diagram illustrating a fingerprint image after image synthesis in a second embodiment.

FIG. 24 is a diagram illustrating a fingerprint image after image synthesis in a second embodiment. In the first embodiment, the example is described above in which a fingerprint image is generated by synthesizing segmented images obtained by segmenting the second region FG into four in the second direction Dy, in other words, the scanning direction, the present embodiment, an example will be described in which a fingerprint image is generated by synthesizing segmented images obtained by segmenting the second region FG into two in the scanning direction and two in the first direction Dx different from the scanning direction as illustrated in FIG. 24. In the following description, any constituent component same as that described above in the first embodiment is denoted by the same reference sign and duplicate description thereof is omitted, and any feature different from the first embodiment will be described.

Figure 25A:
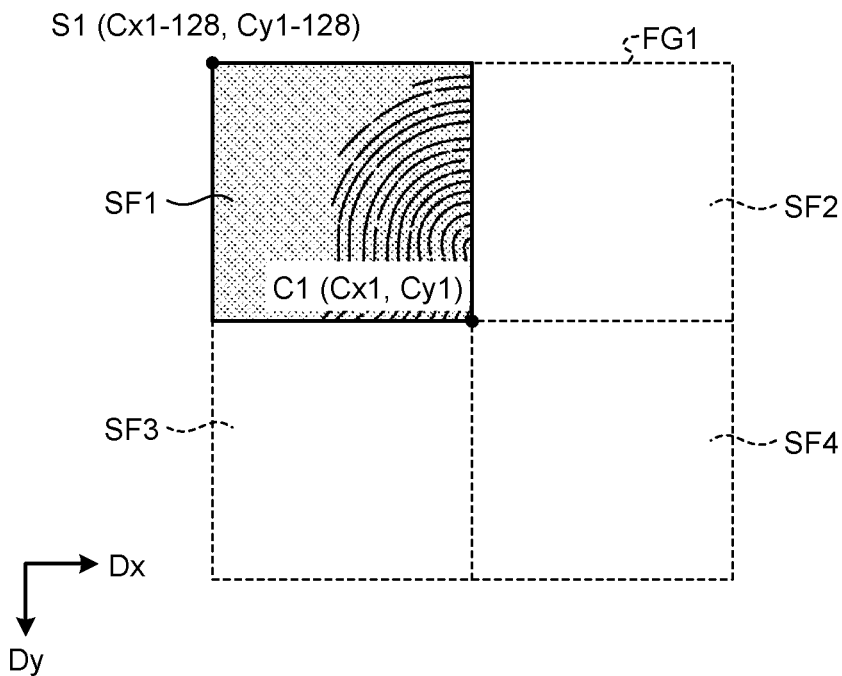
FIG. 25A is a first diagram for description of an acquisition region of a segmented image in a personal authentication method according to the second embodiment.
Figure 25B:
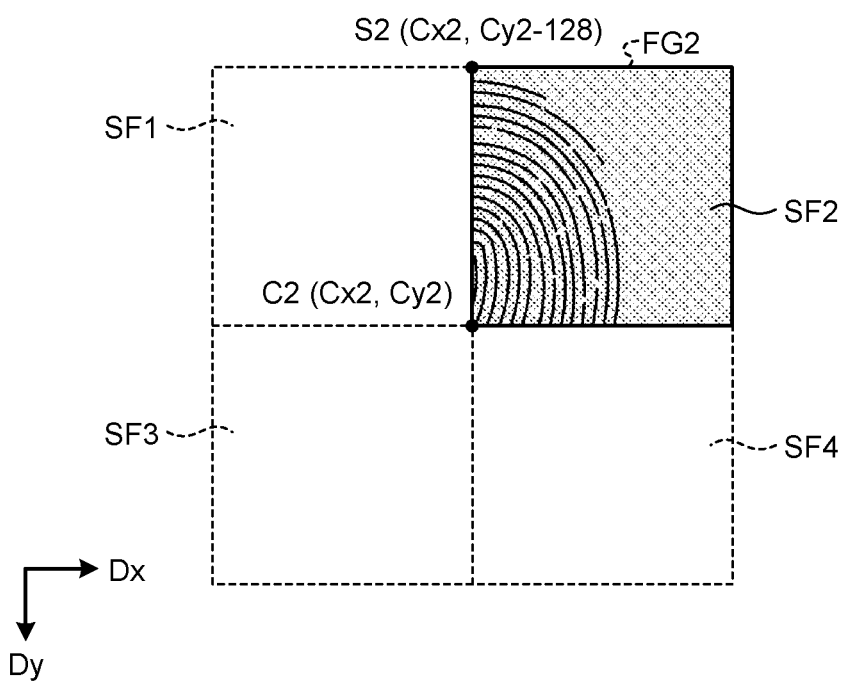
FIG. 25B is a second diagram for description of an acquisition region of a segmented image in the personal authentication method according to the second embodiment.
Figure 25C:
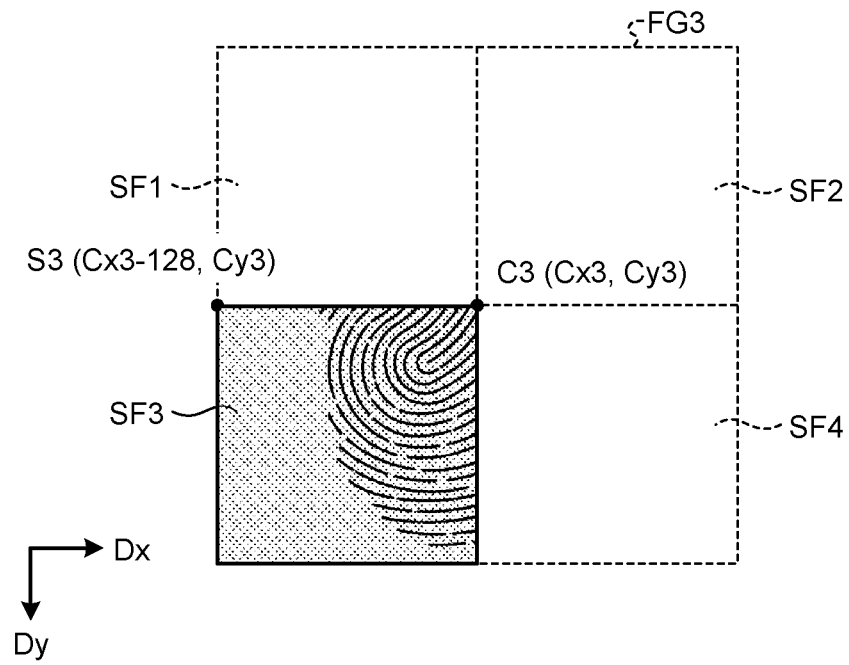
FIG. 25C is a third diagram for description of an acquisition region of a segmented image in the personal authentication method according to the second embodiment.
Figure 25D:
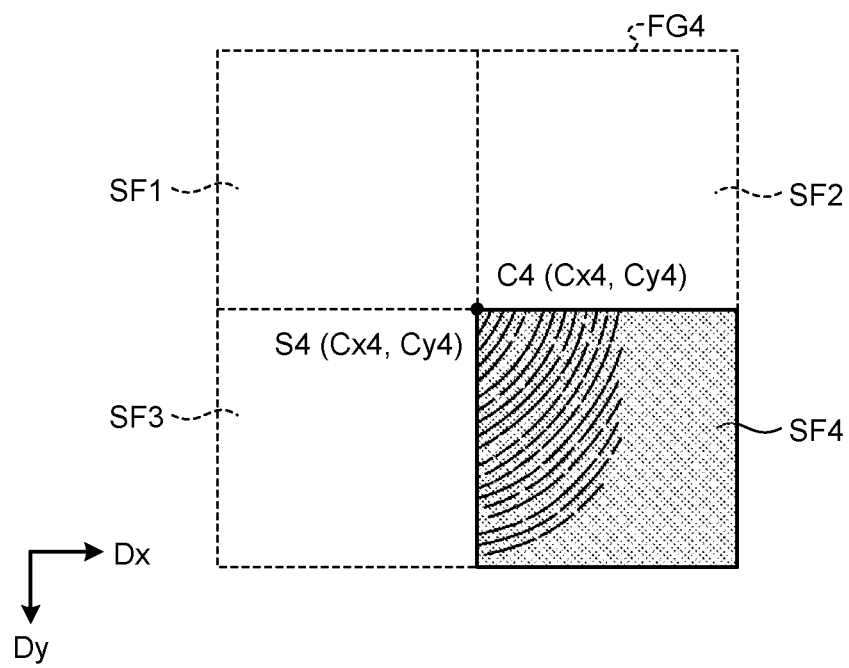
FIG. 25D is a fourth diagram for description of an acquisition region of a segmented image in the personal authentication method according to the second embodiment.

FIG. 25A is a first diagram for description of an acquisition region of a segmented image in a personal authentication method according to the second embodiment. FIG. 25B is a second diagram for description of an acquisition region of a segmented image in the personal authentication method according to the second embodiment. FIG. 25C is a third diagram for description of an acquisition region of a segmented image in the personal authentication method according to the second embodiment. FIG. 25D is a fourth diagram for description of an acquisition region of a segmented image in the personal authentication method according to the second embodiment.

FIG. 25A illustrates an example in which the segmented region SF1 for acquiring a segmented image is allocated in a second region FG1 in key inputting of the first password digit. FIG. 25B illustrates an example in which the segmented region SF2 for acquiring a segmented image is allocated in a second region FG2 in key inputting of the second password digit. FIG. 25C illustrates an example in which the segmented region SF3 for acquiring a segmented image is allocated in a second region FG3 in key inputting of the third password digit. FIG. 25D illustrates an example in which the segmented region SF4 for acquiring a segmented image is allocated in a second region FG4 in key inputting of the fourth password digit. In FIGS. 25A, 25B, 25C, and 25D, the segmented regions SF1, SF2, SF3, and SF4 are allocated in the second regions FG1, FG2, FG3, and FG4 for acquiring segmented images such that the segmented regions are relatively arranged along two directions of the fingerprint scanning direction (second direction Dy) and the direction (first direction Dx) different from the scanning direction.

The following describes an example in which a fingerprint detection region, in other words, a segmented-image acquisition region in the present embodiment can be arbitrarily designated in the detection device 2 and the personal authentication device 1a. In FIGS. 25A, 25B, 25C, and 25D, the size of the second region FG is a 256×256 size with 256 in the first direction Dx and 256 in the second direction Dy.

In the second embodiment, step S107 performed by the detection start coordinate setter 52 and step S108 performed by the fingerprint detection region setter 46 in the personal authentication data acquisition processing illustrated in FIG. 18 are different from those in the first embodiment. The following describes processing performed by the detection start coordinate setter 52 and the fingerprint detection region setter 46 and different from that in FIG. 18.

In the second embodiment, the detection start coordinate setter 52 sets the detection start coordinates S1 (Cx1—128, Cy1—128) with respect to the center coordinates C1 (Cx1, Cy1) of the second region FG1 in key inputting of the first password digit (FIG. 25A).

In this case, the fingerprint detection region setter 46 of the detector 40 allocates, as the fingerprint detection region in which a segmented image is to be acquired, the segmented region SF1 having a 128×128 size with a starting point at the detection start coordinates S1 (Cx1—128, Cy1—128) illustrated in FIG. 25A.

The detection start coordinate setter 52 sets the detection start coordinates S2 (Cx2, Cy2—128) with respect to the center coordinates C2 (Cx2, Cy2) of the second region FG2 in key inputting of the second password digit (FIG. 25B). In this case, since the second password digit is input, the center coordinates of the finger on the detection surface are different from those in the case of the first password digit. Thus, in this case, the center coordinates of the second password digit are indicated as the center coordinates C2 (Cx2, Cy2).

In this case, the fingerprint detection region setter 46 of the detector 40 allocates, as the fingerprint detection region in which a segmented image is to be acquired, the segmented region SF2 having a 128×128 size with a starting point at the detection start coordinates S2 (Cx2, Cy2—128) illustrated in FIG. 25B. In other words, the 128×128 segmented region SF2 with a starting point at the detection start coordinates S2 (Cx2, Cy2—128) illustrated in FIG. 25B is allocated based on the center coordinates of the finger.

The detection start coordinate setter 52 sets the detection start coordinates S3 (Cx3—128, Cy3) with respect to the center coordinates C3 (Cx3, Cy3) of the second region FG3 in key inputting of the third password digit (FIG. 25C). In this case, since the third password digit is input, the center coordinates of the finger on the detection surface are different from those in the cases of the first and second password digits. Thus, in this case, the center coordinates of the third password digit are indicated as the center coordinates C3 (Cx3, Cy3).

In this case, the fingerprint detection region setter 46 of the detector 40 allocates, as the fingerprint detection region in which a segmented image is to be acquired, the segmented region SF3 having a 128×128 size with a starting point at the detection start coordinates S3 (Cx3—128, Cy3) illustrated in FIG. 25C. In other words, the 128×128 segmented region SF3 with a starting point at the detection start coordinates S3 (Cx3—128, Cy3) illustrated in FIG. 25C is allocated based on the center coordinates of the finger.

The detection start coordinate setter 52 sets the detection start coordinates S4 (Cx4, Cy4) with respect to the center coordinates C4 (Cx4, Cy4) of the second region FG4 in key inputting of the fourth password digit (FIG. 25D). In this case, since the fourth password digit is input, the center coordinates of the finger on the detection surface are different from those in the cases of the first, second, and third password digits. Thus, in this case, the center coordinates of the fourth password digit are indicated as the center coordinates C4 (Cx4, Cy4).

In this case, the fingerprint detection region setter 46 of the detector 40 allocates, as the fingerprint detection region in which a segmented image is to be acquired, the segmented region SF4 having a 128×128 size with a starting point at the detection start coordinates S4 (Cx4, Cy4) illustrated in FIG. 25D. In other words, the 128×128 segmented region SF4 with a starting point at the detection start coordinates S4 (Cx4, Cy4) illustrated in FIG. 25D is allocated based on the center coordinates of the finger.

Segmented images of the segmented regions SF1, SF2, SF3, and SF4 set in this manner are acquired and synthesized, whereby a personal authentication fingerprint image with high authentication accuracy can be generated.

Modification

The following describes a modification of the second embodiment. In the second embodiment, it is exemplified that a region in which fingerprint authentication is performed can be arbitrarily designated. By contrast, in the modification of the second embodiment, an example will be described in which the size of the fingerprint detection region is fixed.

Figure 26A:
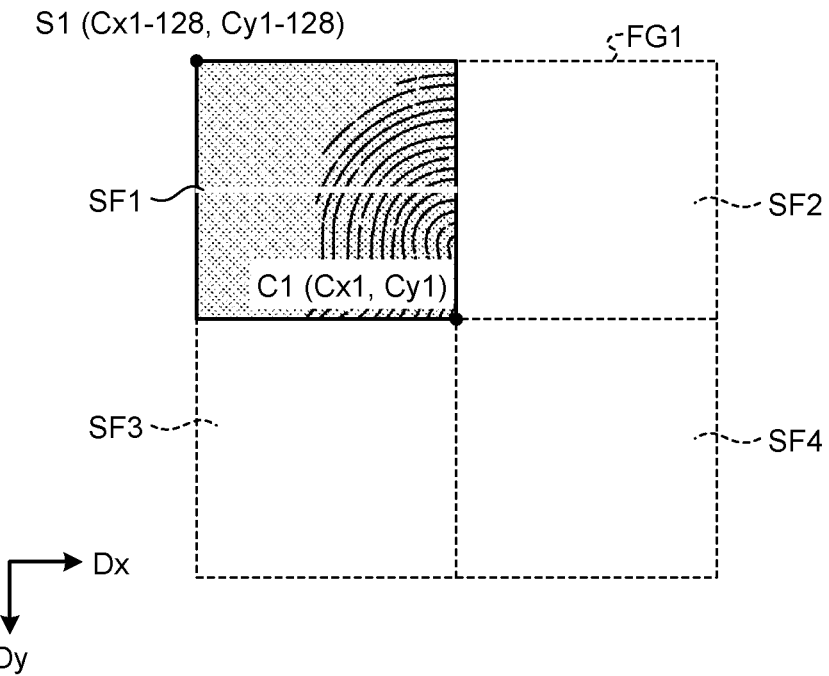
FIG. 26A is a first diagram for description of an image acquisition region in a personal authentication method according to a modification of the second embodiment.
Figure 26B:
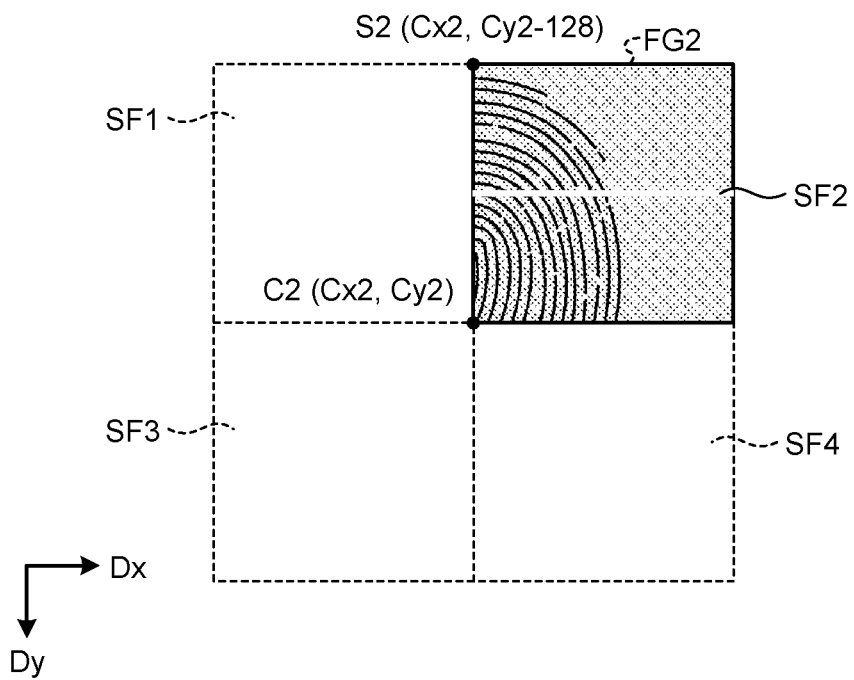
FIG. 26B is a second diagram for description of an image acquisition region in the personal authentication method according to the modification of the second embodiment.
Figure 26C:
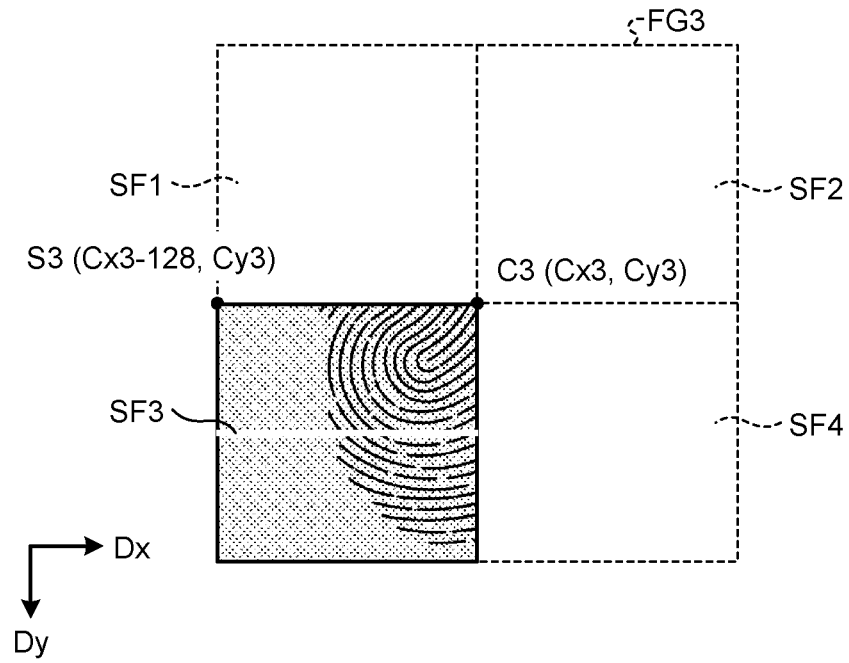
FIG. 26C is a third diagram for description of an image acquisition region in the personal authentication method according to the modification of the second embodiment.
Figure 26D:
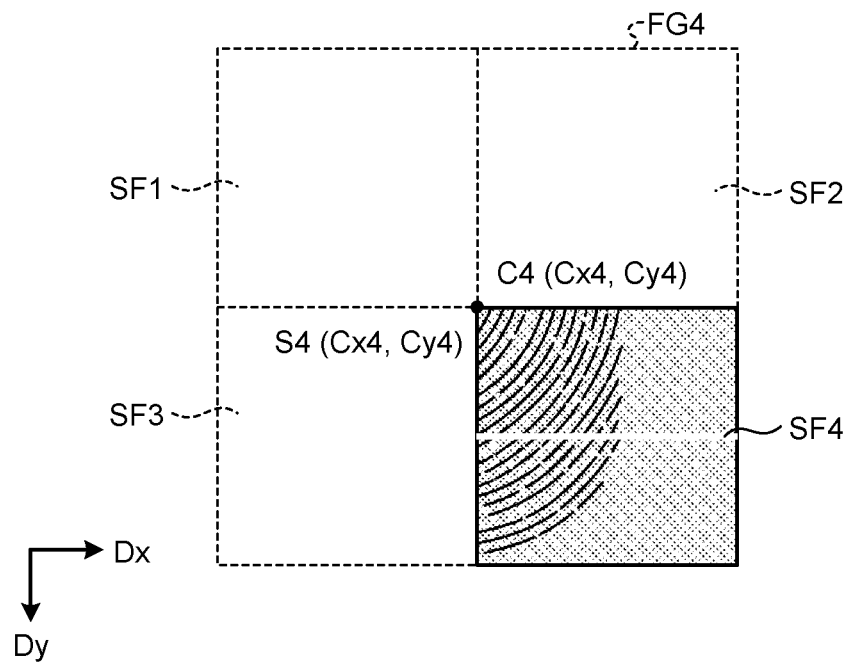
FIG. 26D is a fourth diagram for description of an image acquisition region in the personal authentication method according to the modification of the second embodiment.

FIG. 26A is a first diagram for description of an image acquisition region in a personal authentication method according to the modification of the second embodiment. FIG. 26B is a second diagram for description of an image acquisition region in the personal authentication method according to the modification of the second embodiment. FIG. 26C is a third diagram for description of an image acquisition region in the personal authentication method according to the modification of the second embodiment. FIG. 26D is a fourth diagram for description of an image acquisition region in the personal authentication method according to the modification of the second embodiment. In FIGS. 26A, 26B, 26C, and 26D, the size of the second region FG is a 256×256 size with 256 in the first direction Dx and 256 in the second direction Dy.

FIG. 26A illustrates an example in which the segmented region SF1 for acquiring a segmented image is allocated in a second region FG1 at key inputting of the first password digit. FIG. 26B illustrates an example in which the segmented region SF2 for acquiring a segmented image is allocated in a second region FG2 at key inputting of the second password digit. FIG. 26C illustrates an example in which the segmented region SF3 for acquiring a segmented image is allocated in a second region FG3 at key inputting of the third password digit. FIG. 26D illustrates an example in which the segmented region SF4 for acquiring a segmented image is allocated in a second region FG4 at key inputting of the fourth password digit. In FIGS. 26A, 26B, 26C, and 26D, the segmented regions SF1, SF2, SF3, and SF4 are relatively allocated in the second regions FG1, FG2, FG3, and FG4 for acquiring segmented images for acquiring segmented images such that the segmented regions are relatively arranged along two directions of the fingerprint scanning direction (second direction Dy) and the direction (first direction Dx) different from the scanning direction.

In the modification of the second embodiment, step S107 performed by the detection start coordinate setter 52, step S108 performed by the fingerprint detection region setter 46, and step S109 performed by the segmented image generator 47 in the personal authentication data acquisition processing illustrated in FIG. 18 are different from those in the first embodiment. The following describes processing performed by the detection start coordinate setter 52, the fingerprint detection region setter 46, and the segmented image generator 47 and different from that in FIG. 18.

In the modification of the second embodiment, the detection start coordinate setter 52 sets the detection start coordinates S1 (Cx1—128, Cy1—128) with respect to the center coordinates C1 (Cx1, Cy1) of the second region FG1 in key inputting of the first password digit (refer to FIG. 26A).

In this case, the fingerprint detection region setter 46 of the detector 40 allocates, as the fingerprint detection region, a region having a 128×128 size with a starting point at the detection start coordinates S1 (Cx1—128, Cy1—128) illustrated in FIG. 26A. The fingerprint detection region setter 46 segments the region into two subframes of upper and lower subframes in the scanning direction, each having a 128×64 size, and instructs the detection controller 11 to sequentially scan the subframes. Upon reception of the instruction, the detection controller 11 performs scanning in a 128×64 size with the detection start coordinates S1 (Cx1—128, Cy1—128) as a starting point, and thereafter performs scanning in units of a 128×64 size with second detection start coordinates (Cx1—128, Cy1—64) as a second starting point.

Then, segmented images of the two subframes are generated by the segmented image generator 47 at a later stage. The segmented images are sequentially output to the segmented image receiver 53 of the processor 50. The segmented images of the two subframes corresponding to the segmented region SF1 including the detection start coordinates S1 (Cx1—128, Cy1—128) each stored as buffering data in the first storage 54 by the segmented image receiver 53 of the processor 50.

The detection start coordinate setter 52 sets the detection start coordinates S2 (Cx2, Cy2—128) with respect to the center coordinates C2 (Cx2, Cy2) of the second region FG2 in key inputting of the second password digit (refer to FIG. 26B). In this case, since the second password digit is input, the center coordinates of the finger on the detection surface are different from those in the case of the first password digit. Thus, in this case, the center coordinates of the second password digit are indicated as the center coordinates C2 (Cx2, Cy2).

In this case, the fingerprint detection region setter 46 of the detector 40 allocates, as the fingerprint detection region, a region having a 128×128 size with a starting point at the detection start coordinates S2 (Cx2, Cy2—128) illustrated in FIG. 26B and segments the region into two subframes of upper and lower subframes in the scanning direction, each subframe having a 128×64 size. In other words, subframes are sequentially allocated to two regions into which the 128×128 segmented region SF2 with a starting point at the detection start coordinates S2 (Cx2, Cy2—128) illustrated in FIG. 26B is segmented in the second direction Dy based on the center coordinates of the finger, in order from the upper region.

Then, segmented images of the two subframes are generated by the segmented image generator 47 at a later stage, and the segmented images of the two subframes corresponding to the segmented region SF2 including the detection start coordinates S2 (Cx2, Cy2—128) are each stored as buffering data in the first storage 54 by the segmented image receiver 53 of the processor 50.

The detection start coordinate setter 52 sets the detection start coordinates S3 (Cx3—128, Cy3) with respect to the center coordinates C3 (Cx3, Cy3) of the second region FG3 in key inputting of the third password digit (refer to FIG. 26C). In this case, since the third password digit is input, the center coordinates of the finger on the detection surface are different from those in the cases of the first and second password digits. Thus, in this case, the center coordinates of the third password digit are indicated as the center coordinates C3 (Cx3, Cy3).

In this case, the fingerprint detection region setter 46 of the detector 40 allocates, as the fingerprint detection region, a region having a 128×128 size with a starting point at the detection start coordinates S3 (Cx3—128, Cy3) illustrated in FIG. 26C and segments the region into two subframes of upper and lower subframes in the scanning direction, each subframe having a 128×64 size. In other words, subframes are sequentially allocated to two regions into which the 128×128 segmented region SF3 with a starting point at the detection start coordinates S3 (Cx3—128, Cy3) illustrated in FIG. 26C is segmented in the second direction Dy based on the center coordinates of the finger, in order from the upper region.

Then, segmented images of the two subframes are generated by the segmented image generator 47 at a later stage, and the segmented images of the two subframes corresponding to the segmented region SF3 including the detection start coordinates S3 (Cx3—128, Cy3) are each stored as buffering data in the first storage 54 by the segmented image receiver 53 of the processor 50.

The detection start coordinate setter 52 sets the detection start coordinates S4 (Cx4, Cy4) with respect to the center coordinates C4 (Cx4, Cy4) of the second region FG4 in key inputting of the fourth password digit (refer to FIG. 26D). In this case, since the fourth password digit is input, the center coordinates of the finger on the detection surface are different from those in the cases of the first, second, and third password digits. Thus, in this case, the center coordinates of the fourth password digit are indicated as the center coordinates C4 (Cx4, Cy4).

In this case, the fingerprint detection region setter 46 of the detector 40 allocates, as the fingerprint detection region, a region having a 128×128 size with a starting point at the detection start coordinates S4 (Cx4, Cy4) illustrated in FIG. 26D and segments the region into two subframes of upper and lower subframes in the scanning direction, each subframe having a 128×64 size. In other words, subframes are sequentially allocated to two regions into which the 128×128 segmented region SF4 with a starting point at the detection start coordinates S4 (Cx4, Cy4) illustrated in FIG. 26D is segmented in the second direction Dy based on the center coordinates of the finger, in order from the upper region.

Then, segmented images of the two subframes are generated by the segmented image generator 47 at a later stage, and the segmented images of the two subframes corresponding to the segmented region SF4 including the detection start coordinates S4 (Cx4, Cy4) are each stored as buffering data in the first storage 54 by the segmented image receiver 53 of the processor 50.

Segmented images corresponding to the segmented regions SF1, SF2, SF3, and SF4 set in this manner are acquired and synthesized, whereby a personal authentication fingerprint image with high authentication accuracy can be generated.

Preferable embodiments of the present disclosure are described above, but the present disclosure is not limited to such embodiments. Contents disclosed in the embodiments are merely exemplary, and various kinds of modifications are possible without departing from the scope of the present disclosure. Any modification performed as appropriate without departing from the scope of the present disclosure belongs to the technical scope of the present disclosure.

What is claimed is:

1. A personal authentication system comprising:
   a detection device having a first period in which detection of a detection target body in contact with or in proximity to a sensor is performed and a second period in which detection of asperities on a surface of the detection target body is performed; and
   a control device configured to perform processing in accordance with an output from the detection device,
   wherein the detection device has, as input keys for a password, a plurality of first regions in a detection region of the sensor,
   wherein the detection device is configured to
      allocate mutually different segmented regions in a second region having center coordinates at touch detection coordinates detected in the first region in the first period for each key inputting of the password, and
      output a segmented image acquired in the segmented region in the second period to the control device for each key inputting of the password, and
   wherein the control device is configured to generate a fingerprint image by synthesizing the segmented images acquired in the respective key inputtings of the password.

2. The personal authentication system according to claim 1,
   wherein the detection device is configured to
      transition from the first period to the second period in accordance with a first control signal output from the control device and
      transition from the second period to the first period in accordance with a second control signal output from the control device, and
   wherein the control device is configured to
      output the first control signal when the touch detection coordinates output from the detection device in the first period is coordinates in the first region and
      output the second control signal when having acquired the segmented images in the second period.

3. The personal authentication system according to claim 1, wherein the number of segmentations of the second region is equal to or smaller than the number of digits of the password.

4. The personal authentication system according to claim 1,
   wherein the control device is configured to set detection start coordinates at which segmented image acquisition is to be started for each key inputting of the password, and
   wherein the detection device is configured to allocate each of the segmented regions in which a corresponding one of the segmented images is to be acquired with the detection start coordinates as a starting point.

5. The personal authentication system according to claim 4, wherein the segmented regions, in each of which a corresponding one of the segmented images is acquired in the key inputting of the password, are relatively allocated in the second region such that the segmented regions are relatively arranged along a fingerprint scanning direction.

6. The personal authentication system according to claim 5, wherein the detection start coordinates are relatively set at predetermined intervals in the fingerprint scanning direction in the second region for the respective key inputtings of the password.

7. The personal authentication system according to claim 6, wherein
   the detection device is configured to generate an image of a region including a segmented region for each key inputting of the password, and
   the control device is configured to acquire, as a segmented image, an image of a region included in the segmented region and discard an image of a region not included in the segmented region.

8. The personal authentication system according to claim 4, wherein the segmented regions, in each of which a corresponding one of the segmented images is acquired in the key inputting of the password, are relatively allocated in the second region such that the segmented regions are relatively arranged along two directions of a fingerprint scanning direction and a direction different from the scanning direction.

9. The personal authentication system according to claim 8, wherein
   the detection device is configured to segment a segmented region into a plurality of subframes in the fingerprint scanning direction and generate an image of each subframe for each key inputting of the password, and the control device is configured to acquire, as one segmented image, the images of the respective subframes corresponding to the segmented region.

10. A personal authentication device comprising:
a detector having a first period in which detection of a detection target body in contact with or in proximity to a sensor is performed and a second period in which detection of asperities on a surface of the detection target body is performed; and
a processor configured to perform processing in accordance with an output from the detector,
wherein the detector has a plurality of first regions as input keys for a password in a detection region of the sensor,
wherein the detector is configured to
allocate mutually different segmented regions in a second region having center coordinates at touch detection coordinates detected in the first region in the first period for each key inputting of the password, and
output a segmented image acquired in the segmented region in the second period to the processor for each key inputting of the password, and
wherein the processor is configured to generate a fingerprint image by synthesizing the segmented images acquired in the respective key inputtings of the password.

11. The personal authentication device according to claim 10,
wherein the detector is configured to
transition from the first period to the second period in accordance with a first control signal output from the processor and
transition from the second period to the first period in accordance with a second control signal output from the processor, and
the processor is configured to
output the first control signal when the touch detection coordinates output from the detector in the first period is coordinates in the first region and
output the second control signal when having acquired the segmented images in the second period.

12. The personal authentication device according to claim 10, wherein the number of segmentations of the second region is equal to or smaller than the number of digits of the password.

13. The personal authentication device according to claim 10,
wherein the processor is configured to set detection start coordinates at which segmented image acquisition is to be started for each key inputting of the password, and
wherein the detector is configured to allocate each of the segmented regions in which a corresponding one of the segmented images is to be acquired with the detection start coordinates as a starting point.

14. The personal authentication device according to claim 13, wherein the segmented regions, in each of which a corresponding one of the segmented images is acquired in the key inputting of the password, are relatively allocated in the second region such that the segmented regions are relatively arranged along a fingerprint scanning direction.

15. The personal authentication device according to claim 14, wherein the detection start coordinates are relatively set at predetermined intervals in the fingerprint scanning direction in the second region for the respective key inputtings of the password.

16. The personal authentication device according to claim 15, wherein
the detector is configured to generate an image of a region including a segmented region for each key inputting of the password, and
the processor is configured to acquire, as a segmented image, an image of a region included in the segmented region and discard an image of a region not included in the segmented region.

17. The personal authentication device according to claim 13, wherein the segmented regions, in each of which a corresponding one of the segmented images is acquired in the key inputting of the password, are relatively allocated in the second region such that the segmented regions are relatively arranged along two directions of a fingerprint scanning direction and a direction different from the scanning direction.

18. The personal authentication device according to claim 17, wherein
the detector is configured to segment a segmented region into a plurality of subframes in the fingerprint scanning direction and generate an image of each subframe for each key inputting of the password, and
the processor is configured to acquire, as one segmented image, the images of the respective subframes corresponding to the segmented region.

19. A display device comprising:
the personal authentication device according to claim 10; and
a display panel in which a display region for displaying an image is provided so as to overlap the detection region of the personal authentication device.

20. A personal authentication method in which
a first period in which detection of a detection target body in contact with or in proximity to a sensor is performed and a second period in which detection of asperities on a surface of the detection target body is performed are provided, and
a plurality of first regions as input keys for a password are provided in a detection region of the sensor,
the personal authentication method comprising:
allocating mutually different segmented regions in a second region having center coordinates at touch detection coordinates detected in the first region in the first period in each key inputting of the password and
generating a fingerprint image by synthesizing a plurality of segmented images acquired in the segmented regions in the second period in the respective key inputtings of the password.

* * * * *